(12) United States Patent
Aschwanden et al.

(10) Patent No.: US 11,500,132 B2
(45) Date of Patent: Nov. 15, 2022

(54) TUNABLE LENS DEVICE

(71) Applicant: OPTOTUNE CONSUMER AG, Dietikon (CH)

(72) Inventors: Manuel Aschwanden, Allenwinden (CH); Pit Gebbers, Glattbrugg (CH)

(73) Assignee: OPTOTUNE CONSUMER AG, Dietikon (CH)

( * ) Notice: Subject to any disclaimer, the term of this patent is extended or adjusted under 35 U.S.C. 154(b) by 358 days.

(21) Appl. No.: 16/880,597

(22) Filed: May 21, 2020

(65) Prior Publication Data

US 2020/0355854 A1 Nov. 12, 2020

Related U.S. Application Data

(63) Continuation of application No. 15/821,484, filed on Nov. 22, 2017, now Pat. No. 10,690,815, which is a (Continued)

(30) Foreign Application Priority Data

Oct. 8, 2013 (EP) .................................... 13187802

(51) Int. Cl.
*G02B 3/12* (2006.01)
*G02B 3/14* (2006.01)
(Continued)

(52) U.S. Cl.
CPC .................. *G02B 3/12* (2013.01); *G02B 3/14* (2013.01); *G02B 5/06* (2013.01); *G02B 26/004* (2013.01);
(Continued)

(58) Field of Classification Search
CPC ... G02B 5/06; G02B 3/12; G02B 3/14; G02B 26/004; G02B 26/0883; G02B 27/095; G02B 27/646
(Continued)

(56) References Cited

U.S. PATENT DOCUMENTS 6,747,806 B2    6/2004  Gelbart
7,898,742 B2    3/2011  Fernandez et al.
(Continued)

FOREIGN PATENT DOCUMENTS

CN    101031828    9/2007
CN    101688976    3/2010
(Continued)

OTHER PUBLICATIONS

International Search Report and Written Opinion for related International Application No. PCT/EP2014/071541, dated Jan. 21, 2015 (17 pages).
(Continued)

*Primary Examiner* — William R Alexander
(74) *Attorney, Agent, or Firm* — Crowell & Moring LLP; John C. Freeman

(57) ABSTRACT

An actuator including an electrically conducting coil arranged on or integrated into a wall member, wherein the electrically conducting coil is arranged adjacent to a magnetic flux return structure. A magnet connected to a carrier, wherein the magnet interacts with the electrically conducting coil such that when a current is applied to the coil the coil is either moved towards the carrier along an axial direction or away from the carrier along the axial direction depending on a direction of the current within the coil. A magnetic flux guiding structure connected to the carrier, wherein magnetic flux is guided through the flux return structure and the flux guiding structure.

22 Claims, 17 Drawing Sheets

Related U.S. Application Data continuation of application No. 15/028,150, filed as application No. PCT/EP2014/071541 on Oct. 8, 2014, now Pat. No. 9,841,539.

(51) Int. Cl.

| | | |
|---|---|---|
| G02B 27/64 | (2006.01) | |
| G02B 5/06 | (2006.01) | |
| G02B 26/00 | (2006.01) | |
| G02B 26/08 | (2006.01) | |
| G02B 27/09 | (2006.01) | |

(52) U.S. Cl.
CPC ....... *G02B 26/0883* (2013.01); *G02B 27/095* (2013.01); *G02B 27/646* (2013.01)

(58) Field of Classification Search
USPC ........................................................ 359/557
See application file for complete search history.

(56) References Cited

U.S. PATENT DOCUMENTS

| | | | |
|---|---|---|---|
| 8,111,466 B2 | 2/2012 | Fernandez et al. | |
| 8,116,011 B2 | 2/2012 | Bolis | |
| 8,120,860 B2 | 2/2012 | Suzuki et al. | |
| 8,699,141 B2* | 4/2014 | Aschwanden | G02B 7/10 |
| | | | 359/666 |
| 9,841,539 B2 | 12/2017 | Aschwanden et al. | |
| 2002/0167309 A1 | 11/2002 | Chaparala | |
| 2004/0012683 A1 | 1/2004 | Yamasaki | |
| 2006/0201047 A1 | 9/2006 | Lowrey | |
| 2008/0019015 A1 | 1/2008 | Fernandez et al. | |
| 2008/0144186 A1 | 6/2008 | Feng et al. | |
| 2009/0251792 A1 | 10/2009 | Suzuki et al. | |
| 2010/0118414 A1 | 5/2010 | Bolis | |
| 2010/0128357 A1 | 5/2010 | Szilagyi et al. | |
| 2010/0202054 A1 | 8/2010 | Niederer | |
| 2010/0232031 A1 | 9/2010 | Batchko et al. | |
| 2010/0232161 A1 | 9/2010 | Aschwanden et al. | |
| 2010/0295987 A1 | 11/2010 | Berge | |
| 2011/0017829 A1 | 1/2011 | Wang | |
| 2011/0122495 A1 | 5/2011 | Togashi | |
| 2011/0122504 A1 | 5/2011 | Fernandez et al. | |
| 2011/0158617 A1 | 6/2011 | Svardal et al. | |
| 2011/0222301 A1 | 9/2011 | Knoedgen et al. | |
| 2012/0268712 A1 | 10/2012 | Egan et al. | |
| 2013/0176628 A1 | 7/2013 | Batchko et al. | |
| 2014/0168787 A1 | 6/2014 | Wang | |
| 2014/0285911 A1* | 9/2014 | Aschwanden | H04N 5/2254 |
| | | | 359/824 |

FOREIGN PATENT DOCUMENTS

| | | |
|---|---|---|
| EP | 0587432 A1 | 3/1994 |
| EP | 2071367 A1 | 6/2009 |
| EP | 2107397 A1 | 10/2009 |
| EP | 2338072 B1 | 3/2013 |
| JP | 4-76525 A | 3/1992 |
| JP | H11 133210 A | 5/1999 |
| JP | 2000-221421 A | 8/2000 |
| JP | 2006-330321 A | 12/2006 |
| JP | 2008-058391 A | 3/2008 |
| JP | 2009-168971 A | 7/2009 |
| JP | 2009-251244 A | 10/2009 |
| JP | 2010-113358 A | 5/2010 |
| JP | 2013-085331 A | 5/2013 |
| JP | 2016-535294 A | 11/2016 |
| WO | WO 2006/009514 A1 | 1/2006 |
| WO | WO 2008/100153 A1 | 8/2008 |

OTHER PUBLICATIONS

Notice of Rejection for JP 2018-225538, dated Jan. 21, 2020, 2 pp.
Corresponding U.S. Appl. No. 15/821,484, filed Nov. 22, 2017 (pending).

* cited by examiner

TUNABLE LENS DEVICE

REFERENCE TO EARLIER FILED APPLICATIONS

This application is a continuation of U.S. patent application Ser. No. 15/821,484, filed Nov. 22, 2017 (pending), which is a continuation of U.S. application Ser. No. 15/028,150, filed Apr. 8, 2016, now U.S. Pat. No. 9,841,539, which is a 371 national phase of PCT/EP2014/071541, filed Oct. 8, 2014, and claims the benefit of priority to European Application No. 13187802.7, filed Oct. 8, 2013, the entire disclosures of each of which are incorporated herein by reference.

The invention relates to a tunable lens device according to the preamble of claim 1. Further, the invention relates to a method for adjusting a lens device as well as for providing image stabilization or light beam deflection and shaping.

A lens device of the afore-mentioned kind usually comprises a transparent and elastically expandable membrane, an optical element opposing or facing the membrane, a wall member, wherein the optical element and the membrane are connected to the wall member such that a volume is formed, wherein at least the membrane, the optical element, and said wall member delimit said volume (also denoted as container), a fluid residing in said volume, and a lens shaping member attached to an outside of the membrane, which outside faces away from said volume.

Tunable lens devices, especially for image stabilization are known in the state of the art. US20100295987A1 describes an imaging device where a liquid lens comprises a liquid-liquid interface between first and second immiscible liquids deformable by electro-wetting.

Further, US20110158617A1 discloses an image stabilization device and method, wherein actuators act on both sides of a flexible lens, so as to tilt one side and to bend the other side.

Furthermore, EP2338072A1 describes an electro-active lens comprising an optical element being an elastic solid, wherein upon application of a voltage to electrodes of the optical element, the latter is deformed in order to alter its optical properties.

Based on the above, the problem underlying the present invention is to provide for a lens device that allows for tuning the focus of the lens device as well for adjustments of the light beam direction (e.g. for the purpose of image stabilization or beam redirecting) in a simple manner.

Further, it is an objective of the present invention to provide for a method for adjusting a lens device as well as for a method for image stabilization.

This problem is solved by a lens device having the features of claim 1.

Preferred embodiments of the lens device are stated in the corresponding sub claims and are described below.

According to claim 1, the lens device comprises an actuator means that is designed to move the optical element in an axial direction with respect to the lens shaping member (e.g. towards and away from the lens shaping member), so as to adjust the pressure of the fluid residing inside the volume and therewith a curvature of said membrane, wherein said axial direction is oriented perpendicular to a plane spanned by the lens shaping member, and/or wherein said actuator means is designed to tilt the optical element with respect to said plane, particularly so as to form the volume into a prism for deflecting light travelling through the volume.

Particularly, the fluid resides in the volume such that the curvature of the membrane can be adjusted by adjusting the pressure (or force) exerted on the membrane (e.g. via the lens shaping member). Particularly, the fluid fills the volume completely.

However, according to an aspect of the present invention (e.g. for autofocus applications) the tilting movement can be an optional feature, e.g. merely a (relative) axial movement between the optical element and lens shaping member is necessary.

Generally, according to an aspect of the present invention, the actuator means may rather be designed to move the lens shaping member in an axial direction with respect to the optical element. Then, said axial direction is instead oriented perpendicular to a plane along which the optical element extends (e.g. perpendicular to optical element). Further, the actuator means is then designed to tilt the lens shaping member with respect to said plane (optical element), particularly so as to form the volume into a prism for deflecting light passing through the volume.

In this sense, particularly, moving the optical element in an axial direction with respect to the lens shaping member may also mean a relative movement between these components where for instance the optical element is at rest and the lens shaping member is moved. Likewise, in this sense, particularly, tilting the optical element with respect to said plane, particularly so as to form the volume into a prism for deflecting light passing through the volume, may also mean that the optical element is at rest and said plane (i.e. the lens shaping member) is tilted.

Further, particularly, the notion, that the lens shaping member spans a plane means that the lens shaping member spans or defines a fictitious plane or extends along such a fictitious (extension) plane. This plane being particularly a fictitious plane may be used for defining directions, such as an axial direction running perpendicular to said plane. Particularly, one may also state that said axial direction runs perpendicular to the lens shaper. In embodiments, where the lens shaper is a circumferential structure said structure or a surface thereof extends in said plane (and thus defines or spans said plane).

Particularly, when the optical element is moved along the axial direction the lens shaping member presses against the membrane or pulls the membrane accordingly.

When the lens shaping member presses against the membrane due to the movement of the optical element/wall member towards the fixed lens shaping member, the pressure of the fluid increases due to the essentially constant volume of the fluid causing the membrane to expand and said curvature of the membrane to increase. Likewise when the lens shaping member pushes less against the membrane or even pulls the membrane, the pressure of the fluid decreases causing the membrane to contract and said curvature of the membrane to decrease.

Increasing curvature thereby means that the membrane may develop a more pronounced convex bulge, or that the membrane changes from a concave or a flat state to a convex one. Likewise, a decreasing curvature means that the membrane changes from a pronounced convex state to a less pronounced convex state or even to a flat or concave state, or changes from a flat or concave state to an even more pronounced concave state.

Thus, in other words, the present invention enables autofocus and image stabilization by deforming a membrane by moving only one component axially, here the optical element (or an element such as the wall member connected thereto), with respect to the lens shaping member, and by tilting said component, thus providing a tunable prism.

Hence, advantageously, the invention allows for using the same actuators that are used for deforming the membrane also for x-y scanning (allowing for image stabilization as well as the construction of scanners for beam deflection), while the membrane can still be attached to a fixed lens shaping element. This also allows for preventing lateral displacement of the variable lens surface used for focusing, resulting in better optical quality of the overall optical system.

When tilting, the actuator means is preferably designed to be controlled such that the pressure in the fluid is kept constant, so that the curvature of the membrane is kept constant upon tilting the wall member/optical element.

The membrane can be made of at least one of the following materials: a glass, a polymer, an elastomer, a plastic or any other transparent and stretchable or flexible material. For example, the membrane may be made out of a silicone-based polymer such as poly(dimethylsiloxane) also known as PDMS or a polyester material such as PET or a biaxially-oriented polyethylene terephtalate (e.g. "Mylar").

Further, the membrane can comprise a coating. Further, the membrane can also be structured, e.g. comprise a structured surface.

Further, said fluid preferably is or comprises a liquid metal, a gel, a liquid, a gas, or any transparent, absorbing or reflecting material which can be deformed. For example, the fluid may be a silicone oil (e.g. Bis-Phenylpropyl Dimethicone).

Additionally the fluid may include fluorinated polymers such as perfluorinated polyether (PFPE) inert fluid.

Furthermore, the optical element is preferably rigid compared to the membrane.

Preferably, the optical element is formed out of or comprises: a glass, a plastic, a polymer, or a metal. It can comprise or can be formed as a (e.g. glass) flat window, a lens, a mirror, a micro structured element with refractive, diffractive and/or reflective structures.

Further, to a preferred embodiment of present invention the optical element may comprise a coating (e.g. anti-reflection).

According to a preferred embodiment of the present invention, the actuator means is designed to move the optical element axially and to tilt it at the same time. Preferably such that the axial movement and the tilt movement can be defined as control variables.

According to a preferred embodiment of the present invention, the actuator means is designed to act on the wall member for moving the optical element axially and for tilting the optical element. Alternatively, the actuator means is designed to act on the lens shaping member for moving and/or tiling the lens shaping member. Further, in the sense described above, the actuator means may be designed to generate a relative movement between the optical element and the lens shaping member, where the optical element and the lens shaping member are moved relative to one another along the axial direction or are tilted with respect to one another.

According to a preferred embodiment of the present invention, the wall member is formed by an e.g. rectangular plate having a continuous recess (e.g. in the center of the plate, which recess extends from a first side of the wall member to a second side of the wall member, which second side faces away from the first side, wherein preferably the optical element is connected to the first side so as to cover said recess, and wherein preferably said membrane is connected to the second side of the wall member.

According to a preferred embodiment of the present invention, the lens shaping member is connected to the wall member, preferably to the second side of the wall member via a deformable wall. According to another preferred embodiment of the present invention, the lens shaping element may be connected to the optical element via a deformable wall. Preferably, the deformable wall then extends through the recess of the wall member/plate to the optical element and therefore delimits said volume (instead of the inner side of the recess).

According to a preferred embodiment of the present invention, said deformable wall is formed as a bellows.

Preferably, said bellows comprises a plurality of regions, wherein preferably each two neighboring regions are connected to each other via a crease, so that said neighboring regions can be folded towards and away from each other about the respective crease, particularly such that when the optical element is moved/tilted towards the lens shaping member said neighboring regions are folded towards each other (at least in a region where the optical element and the lens shaping member approach each other), and such that when the optical element is moved/tilted away from the lens shaping member said neighboring regions are folded away from each other (at least in a region where the optical element and the lens shaping member depart from each other).

The creases of the bellows may be structurally reinforced by rigid elongated members.

In a preferred embodiment of the present invention, the bellows comprises two circumferential regions connected via a single circumferential crease of the bellows.

According to a preferred embodiment of the present invention, the lens shaping member delimits an optically active and elastically expandable (e.g. circular) region of the membrane, wherein particularly said region extends up to an (e.g. circumferential) inner edge of the lens shaping member, and wherein particularly said region comprises said curvature of the membrane to be adjusted.

According to a preferred embodiment of the present invention, the lens shaping member is rigidly connected to a carrier, wherein particularly the carrier faces the second side of the wall member. Said carrier may comprise or may be formed by an optical assembly. The optical assembly may be formed or may comprise an image sensor and/or a lens stack, wherein particularly said lens stack is arranged between the image sensor (e.g. CCD sensor) and the membrane.

According to a preferred embodiment of the present invention, the actuator means comprises a plurality of electrically conducting coils, particularly at least three coils, or four coils, which are arranged on or integrated into the wall member, particularly along the recess. Preferably, each coil is equally spaced from its two neighboring coils along the recess.

According to a preferred embodiment of the present invention, the actuator means comprises a magnet means connected to the carrier. Preferably, said magnet means comprises a plurality of magnets being connect to the carrier respectively, wherein each magnet is preferably associated to a different coil. Preferably, said magnet means or said magnets are designed to interact with said coils such that when a current is applied to a coil the respective coil is either moved towards the carrier (along said axial direction) or away from the carrier (along said axial direction) depending on the direction of the respective current. The displacement of the wall member/plate is proportional to the current.

According to a preferred embodiment of the present invention, a magnetic flux guiding structure (e.g. out of a magnetically soft material such as e.g. iron) for shaping the magnetic flux generated by the respective magnet is provided for each magnet, wherein each magnetic flux guiding structure comprises an end region that protrudes through an associated aperture of the wall member as well as into or through the coils associated to the respective magnet. Preferably, the magnetic flux guiding structures are connected to the carrier, respectively.

According to a further embodiment the actuator means comprises a plurality, particularly, two, three or four, electrically conducting coils connected to the carrier. Preferably, the coils are each arranged adjacent to an associated magnetic flux return structure (e.g. out of a magnetically soft material such as e.g. steel).

Further, preferably, the actuator means comprises a corresponding plurality of magnetic flux guiding structures arranged in or on the wall member, wherein each magnetic flux guiding structure is associated to a different coil, and faces or opposes the respective coil/magnetic return structure such that a gap is present between the respective return structure/coil and associated magnetic flux guiding structure. However, according to a further embodiment, it is also possible that the actuator means comprises only a single magnetic flux guiding structure facing or opposing the coils (e.g. the wall member may itself form the magnetic flux guiding structure). Further, according to a further embodiment, it is also possible that the actuator means comprises only a single return structure adjacent said coils.

When a current now flows through the coils, the magnetic flux is guided through the respective return structure and the respective flux guiding structure. Since the system wants to reduce the magnetic resistance, the respective magnetic flux guiding structure will be attracted to the associated return structure to reduce the gap between the two magnetically soft structures and to reduce the resistance for the magnetic flux. Thus, the wall member and optical element are moved. Depending on the current in the respective coil this allows one to move the wall member axially along said axial direction and/or to tilt the wall member with respect to the plane spanned by the lens shaping member. Such an actuator means is also denoted as reluctance actuator.

According to a further embodiment, the actuator means may comprise a plurality of first electrodes, particularly, two, three or four, arranged in or on the wall member, as well as a corresponding plurality of second electrodes connected to the carrier, wherein each first electrode is associated to a different second electrode and faces or opposes the respective second electrode so that a gap is present between the respectively associated electrodes. By applying a voltage between the respective first and second electrodes, the optical element can be axially moved and or tilted with respect to said plane.

According to a preferred embodiment of the present invention, the lens device comprises a position sensor means for detecting the spatial position of the optical element or of a component connected to the optical element such as the wall member, e.g. with respect to a reference position such as the position of the lens shaping member. By adjusting the spatial position of the optical element to a defined state, the optical properties of the lens device can be defined. This includes the optical power of the lens formed by the deformable membrane, and the angle of the variable prism.

When using an actuator means in the form of a reluctance actuator, the position sensor means can advantageously be designed to use a high frequency current signal for measuring the spatial position of the wall member/optical element via the coils. In other words, in an embodiment of the invention, the actuator means is used to detect the spatial position of the wall member/optical element, particularly by being designed to directly sense the reluctance of the reluctance actuator associated to the gap between the flux guiding structure(s) 740 and the return structure(s) 700.

When the wall member moves closer to a coil due to a movement, the gap between the coil/return structure and the wall member becomes less causing the reluctance of the magnetic field to reduce and thus the coil inductance to increase, which is therefore a measure for the width of said gap and therefore for the spatial position of the wall member/optical element. The biggest advantage of this method is that it shows a linear relationship between the output signal and the displacement (gap width) of the wall member/optical element.

According to a preferred embodiment of the present invention, the optical element is transparent. In this case the lens device may be a part of a camera or may itself form a camera, for instance a camera of a mobile phone.

According to another embodiment of the present invention, the optical element is formed as a mirror having a reflecting surface facing e.g. towards said volume. For example, said mirror may be adapted to reflect light that enters the lens trough the membrane, travels through said volume, impinges on the mirror and is then reflected towards the membrane.

In this case the lens device may be a part of a scanner or may itself form a scanner.

Further, the optical element may comprise a coating.

According to a preferred embodiment of the present invention, when said optical element is formed as a mirror, the wall member is connected via a joint to an elongated pin that is slideably arranged in a bushing, wherein particularly said bushing is connected to a housing of the lens device and/or to said carrier. In this manner the movement/tilting of the optical member/wall member can be safely guided.

According to a preferred embodiment of the present invention, the lens device further comprises a movement sensor means for sensing an e.g. unintended rapid movement of the lens device that is to be counteracted. The movement sensor means may be designed to detect a yaw movement and/or pitch movement, i.e. a rotation about two orthogonal axes, which axes are each orthogonal to the optical axis/axial direction.

According to further preferred embodiment of the present invention, for providing image stabilization, the lens device comprises a control unit interacting with said movement sensor means, which control unit is designed to control the actuator means depending on a movement to be counteracted sensed by the movement sensor means such that the optical element is tilted by the actuator means with respect to the plane spanned by the lens shaping member for changing the direction of the incident light beam passing through the lens device in a way that counteracts said sensed unintended rapid movement. This is possible, since the unintended movement causes a displacement of a certain image point, e.g. on the surface of the image sensor, which can be compensated by tilting the optical element and therefore changing the light path of the incident light through the lens device such that the same object point is ending up on the same image sensor location as before the unwanted movement and tilting of the lens device.

Preferably, the control unit is designed to control the actuator means such that the actuator means alters the actual spatial position of the optical element sensed by the position sensor means such that the actual spatial position approaches a reference spatial position of the optical element in which the optical element (and therefore the direction of the incident light beam) is tilted such with respect to the lens shaping member that the unintended rapid movement is counteracted or compensated (see above). Here, alternatively, the actuator means may alter the actual spatial position of the lens shaping member sensed by the position sensor means (i.e. the optical element rests).

A further aspect of the present invention relates to a method for adjusting a lens device having the features of claim 28, wherein particularly the method makes use of a lens device according to the invention.

According to claim 28, the lens device comprises a transparent and elastically expandable membrane, an optical element facing or opposing the membrane, a wall member, wherein the optical element and the membrane are connected to the wall member such that a volume is formed, a fluid residing in said volume, and a lens shaping member connected to an outside of the membrane, which outside faces away from said volume, and wherein the optical element (or alternatively the lens shaping member) is tilted with respect to a plane spanned by the lens shaping member (or with respect to the optical element in case the lens shaping member is tilted) so as to form the volume into a prism for deflecting light passing through the volume.

This method may be used for cameras as well as scanners etc.

Preferably, the optical element is moved also in an axial direction with respect to the lens shaping member (or vice versa), e.g. towards and away from the lens shaping member) so as to adjust the pressure of the fluid residing inside the volume and therewith a curvature of said membrane (particularly so as to adjust the focus of the lens device automatically), wherein said axial direction is oriented perpendicular to said plane (or, as the case may be, to the optical element).

Preferably, the optical element is moved axially by moving the wall member or plate axially along said axial direction. Preferably, the optical element is tilted by tilting the wall member or plate with respect to said plane.

Yet a further aspect of the present invention relates to a method for providing image stabilization having the features of claim 29, wherein particularly the method makes use of a lens device according to the invention.

According to claim 29, the lens device comprises a transparent and elastically expandable membrane, an optical element facing or opposing the membrane, a wall member, wherein the optical element and the membrane are connected to the wall member such that a volume is formed, a fluid residing in said volume, and a lens shaping member connected to an outside of the membrane, which outside faces away from said volume, wherein an unintended rapid movement of the lens device to be counteracted is sensed (e.g. by a movement sensor means), and wherein an actuator means is controlled (e.g. by a control unit) depending on said sensed movement to be counteracted such that the optical element is tilted by the actuator means with respect to a plane spanned by the lens shaping member (or such that the lens shaper is tilted by the actuator means with respect to a plane along which the optical element extends) for changing the direction of the incident light beam passing through the lens device in a way that counteracts said sensed movement (see also above). When tilting, the actuator means is preferably designed (or controlled) such that the pressure in the fluid is kept constant, so that the curvature of the membrane is kept constant.

According to a preferred embodiment of this method, particularly for providing autofocus of the lens device in parallel, particularly at the same time, the optical element is moved by the actuator means in an axial direction with respect to the lens shaping member (or vice versa). e.g. towards and away from the lens shaping member, so as to adjust the pressure of the fluid residing inside the volume and therewith a curvature of said membrane, wherein said axial direction is oriented perpendicular to said plane spanned by the lens shaping member.

Preferably, the optical element is moved axially by moving the wall member or plate axially along said axial direction. Preferably, the optical element is tilted by tilting the wall member or plate with respect to said plane.

According to yet another preferred embodiment of the present invention the actuator means comprises at least one magnet. The at least one magnet may comprise a first and a second side which faces away from the first side. Particularly, the at least one magnet comprises a circumferential or annular shape, so that the at least one magnet comprises a continuous recess extending from the first side to said second side of the at least one magnet.

Particularly, the at least one magnet (or the plurality of magnets, see below) is magnetized perpendicular to said plane in the axial direction.

Further, the lens device particularly comprises a magnetic flux return structure for guiding magnetic flux towards said magnet. Particularly, said return structure (see also above for possible materials) extends along the at least one magnet.

In this respect, particularly, the return structure comprises a circumferential or annular shape and particularly extends along or faces the first side or the second side of the at least one magnet.

Further, particularly, said actuator means comprises at least one coil associated to said at least one magnet, which at least one coil comprises a conductor that is wound around a coil axis running perpendicular to said plane or to said optical element.

Particularly, the coil axis coincides with a cylinder axis of the at least one magnet or runs parallel to said cylinder axis of the at least one magnet. Particularly, also the magnetization of the at least one magnet runs parallel to said coil axis and/or cylinder axis.

Further, according to an embodiment, said coil extends along the at least one magnet and faces the at least one magnet (wherein said at least one coil particularly faces the first side or the second side of the at least one magnet), so that when a current is applied to the coil, a Lorentz force is generated that causes the at least one magnet and the at least one coil to attract each other or to repel each other depending on the direction of the current in the at least one coil, particularly so that the optical element is moved in the axial direction with respect to the lens shaping member (or vice versa: so that the lens shaping member is moved in the axial direction with respect to the optical element, see also above) so as to adjust the pressure of the fluid residing inside the volume and therewith a curvature of said membrane (said axial direction is oriented perpendicular to a plane along which the lens shaping member extends, or along which the optical element extends, see above), and/or so as to tilt the optical element with respect to said plane, e.g. the lens shaping member (or vice versa: so as to tilt the lens shaping member with respect to the optical element, see above), particularly so as to form the volume into a prism for deflecting light passing through the volume.

In the above, said at least one coil can have only one winding direction throughout. In an embodiment, only one such coil may be present. The coil then extends particularly along the associated (e.g. single) magnet following the circumferential or annular course of said magnet and facing one or the other side of the magnet.

Further, in another embodiment, in order to increase magnetic forces and their efficiency. the at least one coil comprises an outer first section surrounding an inner second section of the coil (which second section is connected in an electrically conducting fashion to the first section), wherein the conductor is wound around said coil axis running perpendicular to said plane or said optical element such that each section of the coil extends along the at least one magnet (which in this embodiment may be a single magnet) and faces the at least one magnet, wherein in said first section the conductor has a winding direction that is opposite to the winding direction of the conductor in the second section of the coil, so that when a current is applied to the coil, the current flows in one direction in the first section and in the opposite direction in the second section of the coil, and a Lorentz force is generated that either attracts the coil or magnet towards the lens shaping member or pushes the coil or magnet away from the lens shaping member depending on the direction of the current in said sections of the coil. Particularly this allows for generating said axial movement between the optical element and the lens shaping member described above.

Here, instead of having electrically connected sections of a (single) coil one may also provide two separate coils having opposite winding directions or currents in opposite directions.

According to a further embodiment, particularly, for tilting the lens shaping member with respect to the optical element or vice versa, a plurality of magnets is provided which are then particularly arranged around the axis of the lens device (i.e. around the volume of the lens device or along said circumferential return structure). Then, particularly, to each magnet a different coil of a plurality of coils is preferably associated that faces the respective magnet (e.g. its first or second side).

In case of such a plurality of magnets, the coils do not need to have said first and second section described above. Particularly, each coil has a particularly elongated and/or curved contour, following a (particularly elongated and/or curved) contour of the associated magnet (e.g. contour of the first or second side of the respective magnet) so that in one (e.g. outer) half of the coil (which half particularly extends along the elongated dimension of the coil) the current flows in a first direction along the associated magnet while it flows in the opposite direction in the other (e.g. inner) half of the coil (which other half particularly also extends along the elongated dimension of the coil).

In the above, according to an embodiment, the wall member or at least a part of the wall member may be formed by the at least one magnet. The at least one magnet (or a plurality of magnets) can be surrounded by a holding material. Particularly the wall member may be formed by a single magnet. Particularly, the optical element is then connected to the first side of the at least one magnet (or wall member). Further, particularly, said membrane is then connected to the second side of the at least one magnet (wall member). Further, in this embodiment, the return structure is particularly connected to the first side of the at least one magnet (wall member), and the optical element is particularly connected to the first side of the at least one magnet (wall member) via said return structure.

Further, in this embodiment, the at least one coil or the plurality of coils (e.g. when having a plurality of associated magnets but also when having a single associated magnet) is held by a coil frame, particularly having a circumferential or annular shape. Particularly said coil frame faces the at least one (or single) magnet (for instance the second side of the magnet to which the membrane is attached). Particularly, the lens shaping member is connected, particularly integrally, to the coil frame.

In the above, according to another embodiment, the wall member may be designed to hold the at least one coil (or said plurality of coils), so that particularly the at least one coil surrounds said volume. Further, a position sensor means or feedback sensor, e.g. a Hall sensor, for detecting the spatial position of the at least one (or single) magnet with respect to the at least one (or single) coil or vice versa may be connected to the wall member. Here, particularly, the wall member forms, together with the optical element and the membrane a container (volume) for holding the fluid as well as the at least one coil or the plurality of coils and eventually said sensor. The coil and wall member can be a printed circuit board.

Particularly, in this embodiment, the at least one magnet or the plurality of magnets is connected, particularly integrally, to the lens shaping member.

According to a further embodiment, the lens device comprises a temperature sensor that is measuring the temperature of the lens device. The measured temperature can be used to calibrate the lens and make its optical power response to the control signal less temperature sensitive.

Further, according to an embodiment of the present invention, a field guiding plate is placed such that an attractive force builds up between the at least one (or single) magnet and the field guiding plate, such that the force increases when said magnet is moved towards the field guiding plate when the lens (e.g. membrane) becomes more deflected.

Further, according to an embodiment, the lens device may be formed as a so-called double liquid lens. Here, the lens device comprises a further volume on a side facing away from said volume being filled with said fluid, wherein the further volume is filled with a further fluid. The membrane here also delimits one side of said further volume. The advantage of such a configuration is the fact, that the further liquid prevents e.g. a vertically extending membrane from becoming deformed due to gravitation. Embodiments of such lens devices are shown for instance in FIGS. 31 to 36.

Particularly, the lens device according to the invention can be applied in the following: Lighting fixtures, light shows, printers, medical equipment, fiber coupling, head worn glasses, laser processing, biometric, metrology, electronic magnifiers, robot cam, fiber coupling, motion tracking, intra-ocular lenses, mobile phones, military, digital still cameras, web cams, microscopes, telescopes, endoscopes, binoculars, research, industrial applications, surveillance camera, automotive, projectors, ophthalmic lenses, vision systems, range finders, bar code readers.

Further features and advantages of the present inventions as well as embodiments of the present invention shall be described in the following with reference to the Figures, wherein FIGS. 1-3 show schematical cross sectional views of a lens device according to the invention having a transparent optical element that is oriented parallel to the membrane (FIG. 1) or tilted with respect to the membrane (FIGS. 2 and 3) for deflecting a light beam passing through the volume of the tunable lens;

Figure 1:
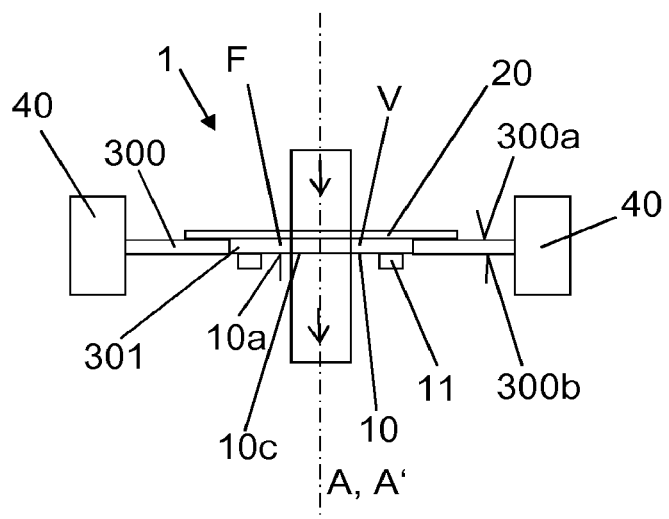
Figure 2:
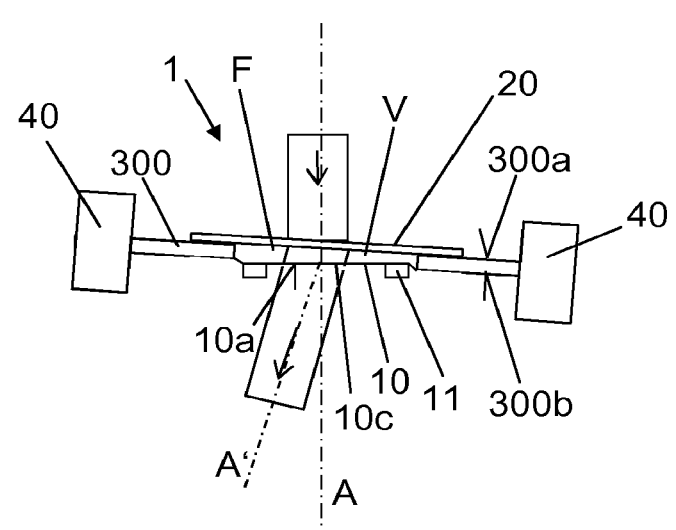
Figure 3:
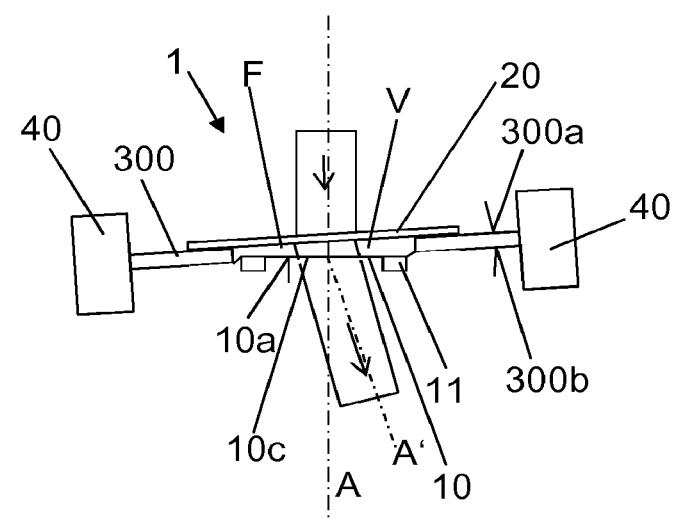

FIGS. 1 to 3 show schematical cross sectional views of a tunable lens device 1 according to the invention. The lens device 1 comprises a transparent and elastically expandable membrane 10, a transparent (e.g. planar) optical element 20 facing or opposing the membrane 10, a wall member 300 in the form of a rectangular plate 300 having a continuous circular recess 301 formed therein in the center of the plate 300, which recess 301 extends from a first side 300*a* of the plate 300 to a second side 300*b* of the plate 300, which second side 300*b* faces away from the first side 300*a*. The rigid optical element 20 is connected to the first side 300*a*, whereas said membrane 10 is connected to the second side 300*b* such that a volume or container V is formed that is at least delimited by the membrane 10, the optical element 20, and said plate 300. The volume V is completely filled with a transparent fluid F. The optical element 20, said volume V with the fluid F residing therein and the membrane 10 form a tunable lens. For adjusting the curvature, particularly the focus of this lens, the lens device 1 further comprises a lens shaping member 11 that is attached to an outside 10*a* of the membrane 10, which outside 10*a* faces away from said volume V. The lens shaping member 11 thereby delimits an optically active and elastically expandable (e.g. circular) region 10*c* of the membrane 10, wherein particularly said region 10*c* extends up to an (e.g. circumferential) inner edge of the lens shaping member 11, and wherein particularly said region 10*c* comprises said curvature of the membrane 10 to be adjusted. The lens shaping member 11 may be formed as an annular (e.g. circular) frame for generating a spherical tunable lens, but may also have any other geometry. For instance, a lens shaping member having two parallel opposing linear frame members (i.e. two frame members that face each other) may be used for generating a tunable cylinder lens.

As shown in FIGS. 1 to 3, the lens device 1 comprises an actuator means 40 that is designed to tilt the optical element 20 with respect to a plane spanned by the lens shaping member 11 (i.e. the lens shaping member 11 defines said fictitious plane or extends in or along said fictitious plane), which allows one to give the volume V under the optical element 20 the form of a prism, such that light that passes the volume V is deflected as indicated in FIGS. 2 and 3. This can be employed for image stabilization as well as scanning.

When the lens device 1 is used in or as a camera, an image point on the surface of an image sensor 52 (cf. FIG. 16 for instance) may be shifted due to an unintended rapid movement of the lens device 1. This can be counteracted by shifting the crossing point between the incident light beam A' associated to an object point and the surface of the image sensor 52 in the opposite direction. For this, the lens device 1 may comprise a movement sensor means for sensing said unintended rapid movement of the lens device 1 to be counteracted, wherein the lens device 1 may further comprise a control unit connected to the movement sensor means, which control unit is designed to control the actuator means 40 depending on the movement to be counteracted sensed by the movement sensor means such that the optical element 20 is tilted by the actuator means 40 with respect to said plane spanned by the lens shaping member 11 (i.e. along which plane the lens shaping member extends) for changing the course of the incident light beam A' associated to an object point in a way that counteracts said sensed movement, i.e., the shift of an image point on the surface of an image sensor (or image plane) due to a rapid and unintended movement of the lens device 1 is compensated by a shift of the crossing point of said incident light beam A' associated to an object point and the image sensor (image plane) in the opposite direction.

Figure 4:
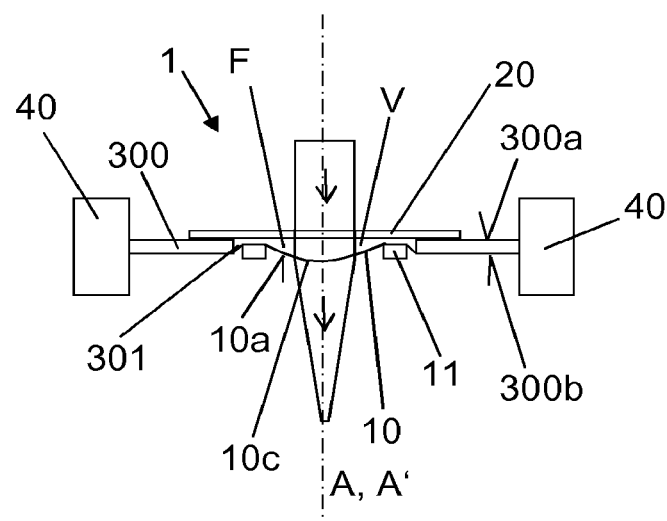
FIGS. 4-6 show schematical cross sectional views of the lens device shown in FIGS. 1-3 wherein in addition the curvature of the membrane is adjusted by means of a lens shaping member acting on the membrane for focusing the light beam.
Figure 5:
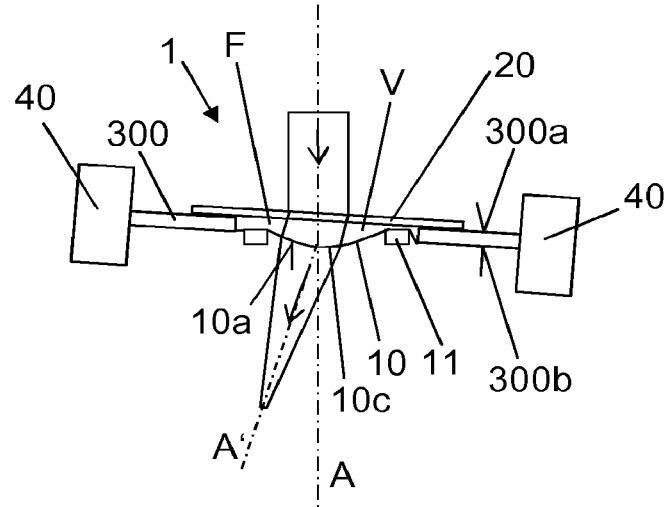
Figure 6:
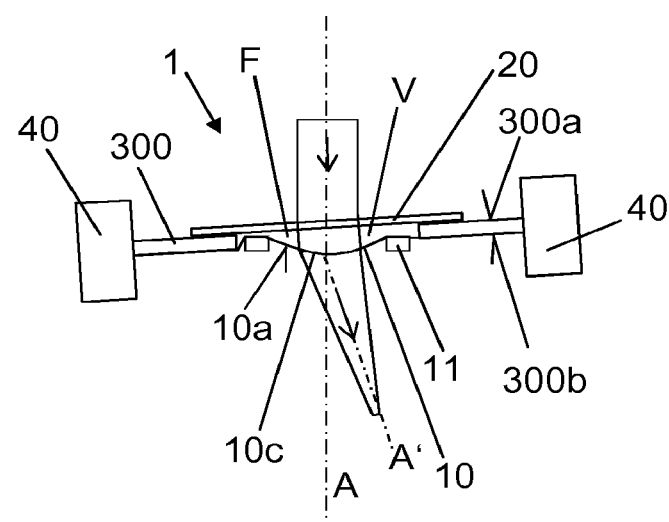

As shown in FIGS. 4 to 6 the lens device 1 according to the invention is further capable of deforming the membrane 10 at the same time by pressing with the lens shaping member 11 against the membrane 10. This can be achieved by means of the same actuator means 40 that is also designed to move the optical element 20 in an axial direction A (being oriented perpendicular to the plane spanned/defined by the lens shaping member 11) with respect to the lens shaping member 11 so as to adjust the pressure of the fluid F residing inside the volume V and therewith a curvature of said membrane 10 (see also above). This particularly allows one to change the curvature between two different convex curvatures, or two different concave curvatures, or even between a convex and a concave curvature. Thus, the focus of the tunable lens can be altered very effectively. Preferably, the actuator means 40 is designed to act on the wall member 300 for moving the optical element 20 axially as well as for tilting the optical element 20 with respect to the fixed lens shaping member 11.

Figure 7:
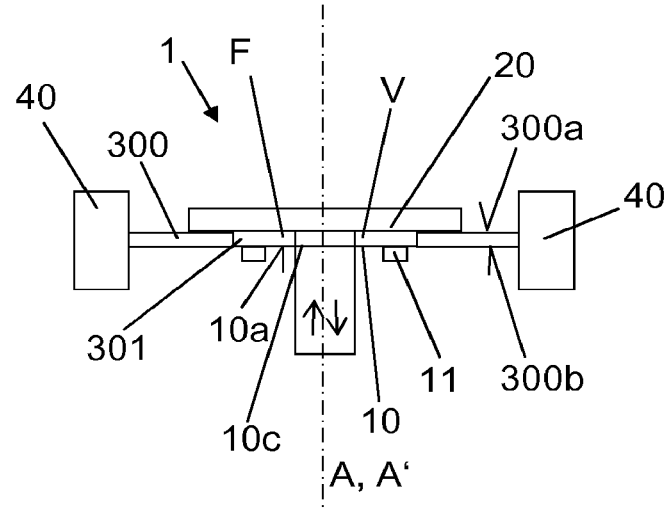
FIGS. 7-9 show schematical cross sectional views of a further lens device according to the invention having an optical element in the form of a mirror that is oriented parallel to the membrane (FIG. 1) or tilted with respect to the membrane (FIGS. 2 and 3) for deflecting a light beam passing through the volume of the tunable lens.
Figure 8:
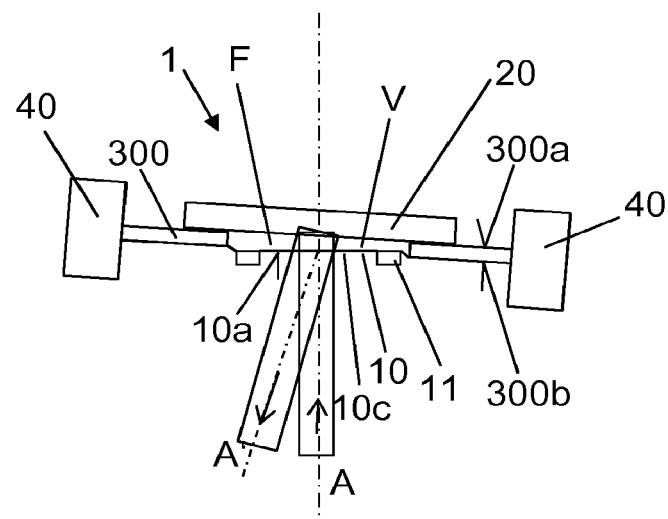
Figure 9:
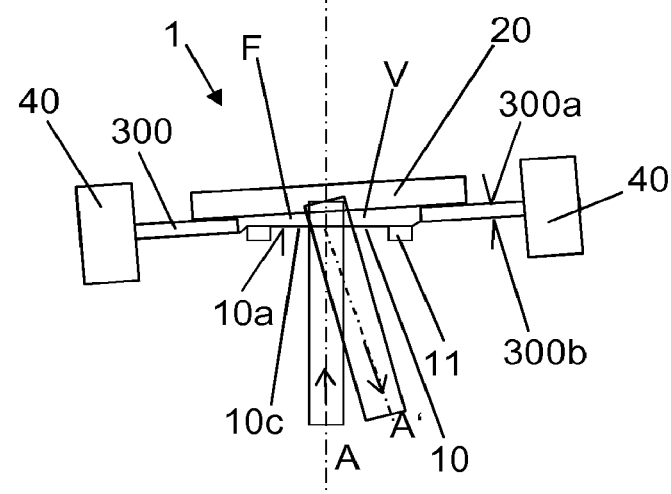

FIGS. 7 to 9 also show tilting movements of a lens device 1 according to the invention, wherein, in contrast to FIGS. 1 to 6, the lens device 1 now comprises an optical element 20 in form of a mirror that has a reflecting surface that faces the volume V of the tunable lens. Here, tilting of the optical element 20 allows for scanning a 2D image plane.

Figure 10:
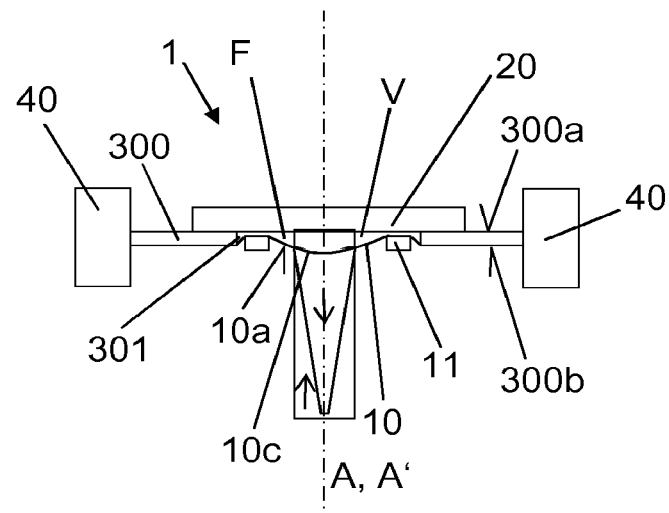
FIGS. 10-12 show schematical cross sectional views of the lens device shown in FIGS. 7-9, wherein in addition the curvature of the membrane is adjusted by means of a lens shaping member acting on the membrane for focusing the light beam.
Figure 11:
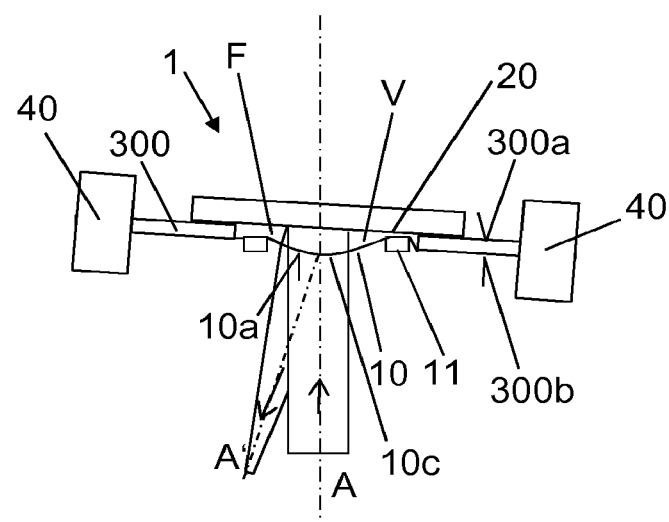
Figure 12:
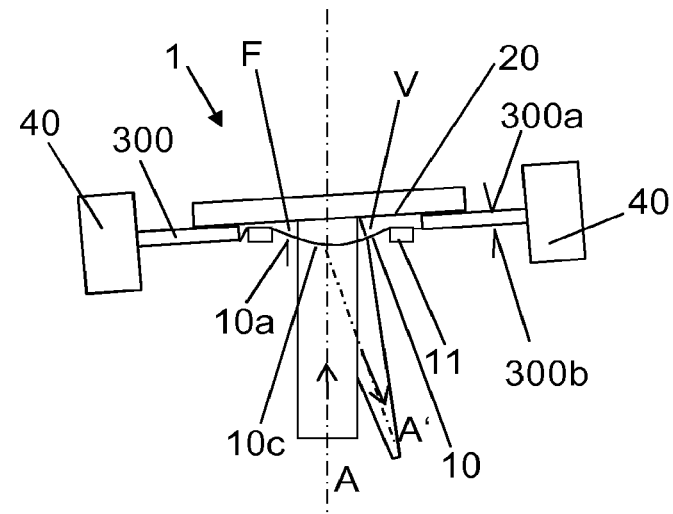

As shown in FIGS. 10 to 12 this can also be combined with deforming the membrane 10 for adjusting the focus of the tunable lens as discussed before with respect to FIGS. 4 to 6 such that 3D scanning is possible.

Figure 13:
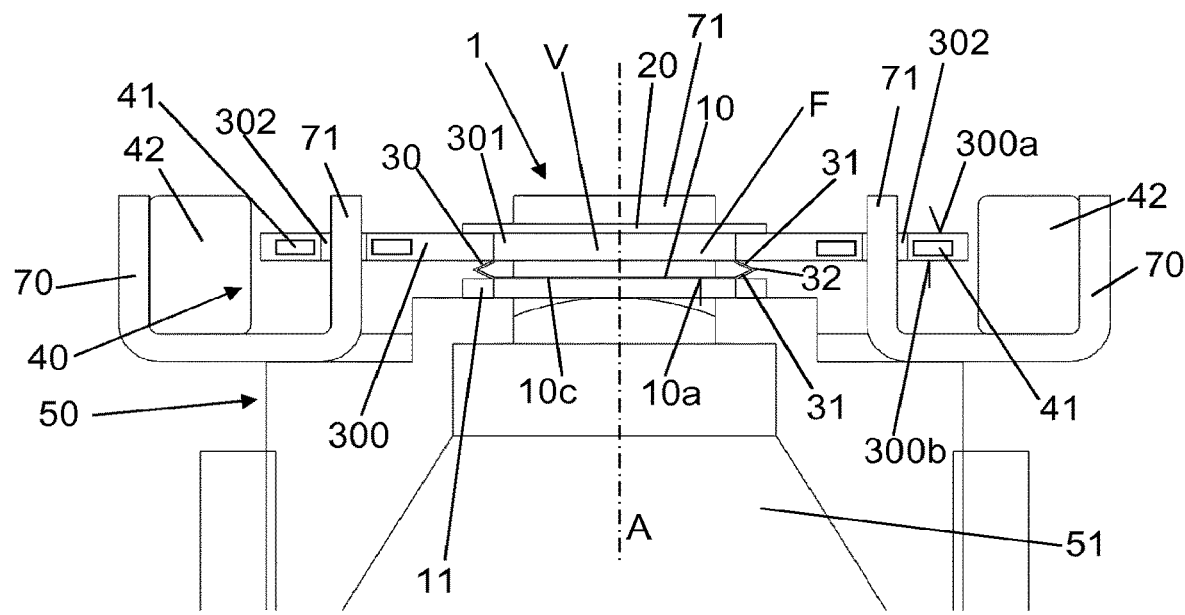
FIGS. 13-15 shows cross sectional views of a lens device according to the invention having a bellows and a transparent optical element.
Figure 14:
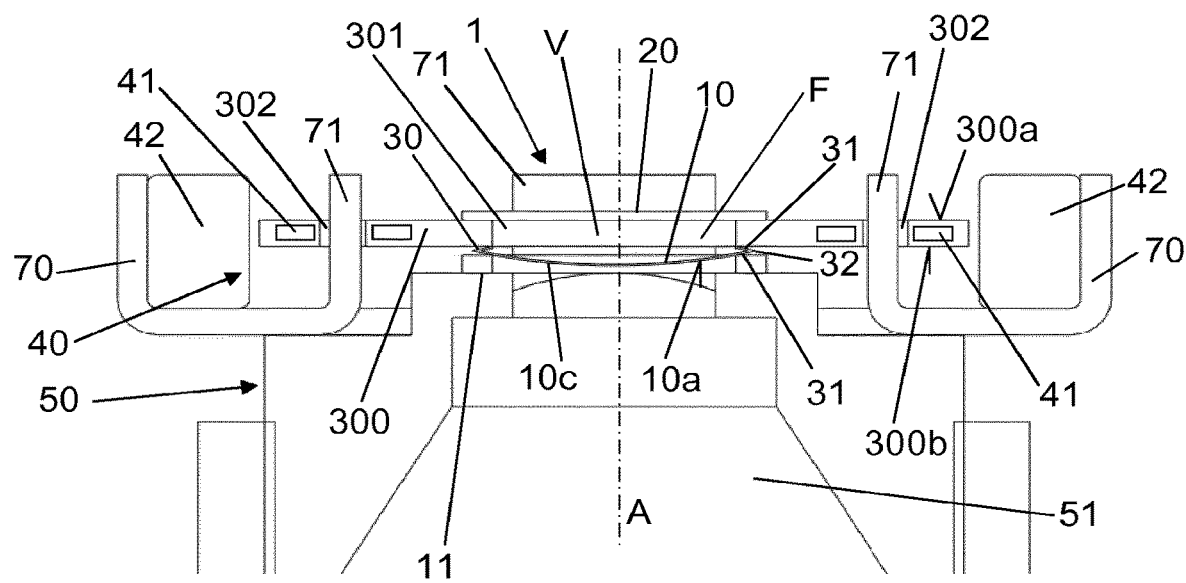
Figure 15:
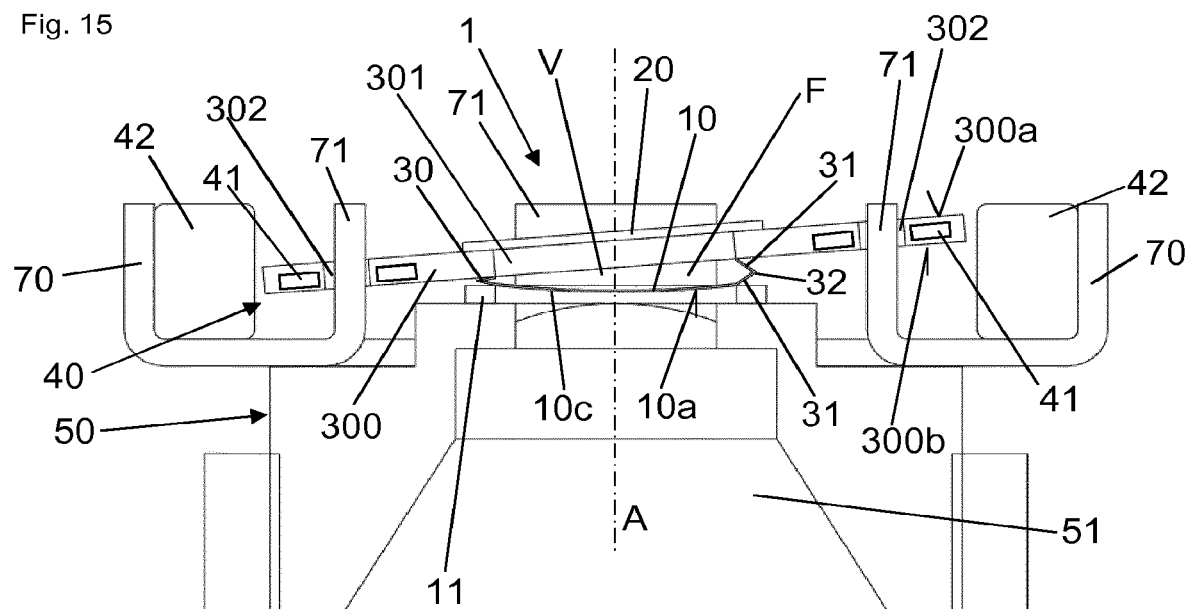

FIGS. 13 to 15 show a lens device 1 of the kind shown in FIGS. 1 to 6, which may form part of a camera, particularly of a camera of a mobile phone. Said device 1 comprises in addition a circumferential bellows 30 which connects the lens shaping member 11 that is attached to the outside 10a of the membrane 10 thus defining said region 10c to the second side 300b of the plate 300 adjacent to the recess 301 of the plate 300. The bellows 30 has two circumferential regions 31 extending along the lens shaping member 11 as shown in FIG. 13, which regions 31 are connected to each other via a circumferential crease 32 extending along said lens shaping member 11. This allows for a contracting and prolonging the bellows 30 along the axial direction A and therefore allows for a pronounced tilting movement/axial movement of the plate 300/optical element 20. A contracted bellows 30 due to an axial movement of the plate 300 towards the lens shaping member 11 is shown in FIG. 14. As a consequence said region 10c of the membrane 10 develops a pronounced convex bulge. A more elongated state of the bellows 30 is shown in FIG. 13 leading to a flat region 10c of the membrane 10. Further, FIG. 15 shows a tilted plate 300/optical element 20 in combination with a convex bulge of the region 10c of the membrane 10 due to an axial movement of the plate 300/optical element 20 towards the lens shaping member 11.

As indicated in FIGS. 13 to 15 the lens shaping member 11 is further connected to a carrier 50, which faces the second side 300b of the plate 300. Said carrier 50 may comprise or may be formed as an optical assembly such as a lens stack 51 and/or an image sensor 52 (cf. FIG. 16). Thus the lens shaping member 11 is fixed and axial movement and tilting of the optical element 20 with respect to the lens shaping member 11 is accomplished by merely axially moving/tilting the plate 300 by means of said actuator means 40.

As can be seen from FIGS. 10 to 13, the actuator means 40 comprises four electrically conducting coils 41 being integrated into the plate 300 along the circular recess 301, wherein each coil 41 is equally spaced from its two neighboring coils 41 along the circular recess 301.

The actuator means 40 further comprises four magnets 42, wherein each magnet 42 is associated to one of the coils 41, wherein said magnets 42 are connected to the carrier 50 and arranged adjacent to the associated coil 41, wherein the respective magnet 42 is arranged radially farther outward than the associated coil 41.

Said magnets 42 are designed to interact with the respectively associated coils 41 such that when a current is applied to a coil 41, the respective coil 41 is either moved towards the carrier 50 or away from the carrier 50 depending on the direction of the respective current.

Figure 21:
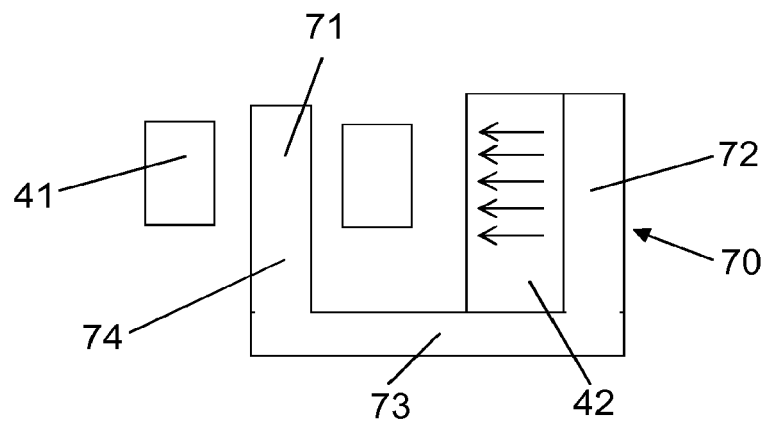
FIG. 21-23 show schematical cross sectional views of magnetic flux guiding structures that can be used with the magnets of an actuator means of a lens device according to the invention.

Further, as shown in FIG. 12 to 15, for guiding the magnetic flux of the magnets 42, a magnetic flux guiding structure 70 is provided for each magnet 42, wherein each magnetic flux guiding structure 70 comprises, as shown in FIG. 21 a first arm 72 extending along the axial direction A and an opposing parallel second arm 74 (i.e. arm 72 faces arm 74) being connected to the first arm via a third arm 73 of the structure 70, which third arm 73 extends perpendicular to the axial direction A and connects a lower end of the first arm 72 to a lower end of the second arm 74. The structure 70 further comprises an end region 71 of the second arm 74, wherein each of the four end regions 71 protrudes through an associated aperture 302 formed in the plate 300 as well as into or through the respective associated coil 41. The magnets 42 are arranged adjacent to the respective first arm 72 such that the magnetization of the respective magnet 42 points towards the second arm 74 and such that the respective magnet 42 is arranged between the respective first arm 72 and the respective coil 41.

Figure 22:
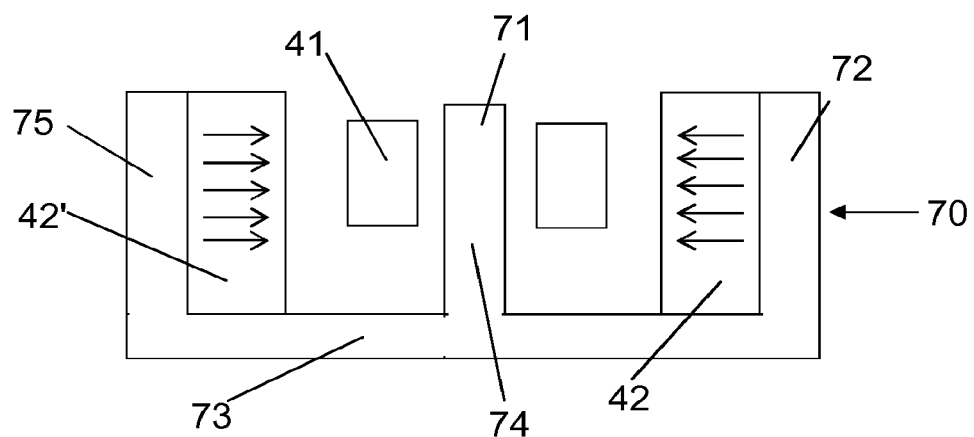
Figure 23:
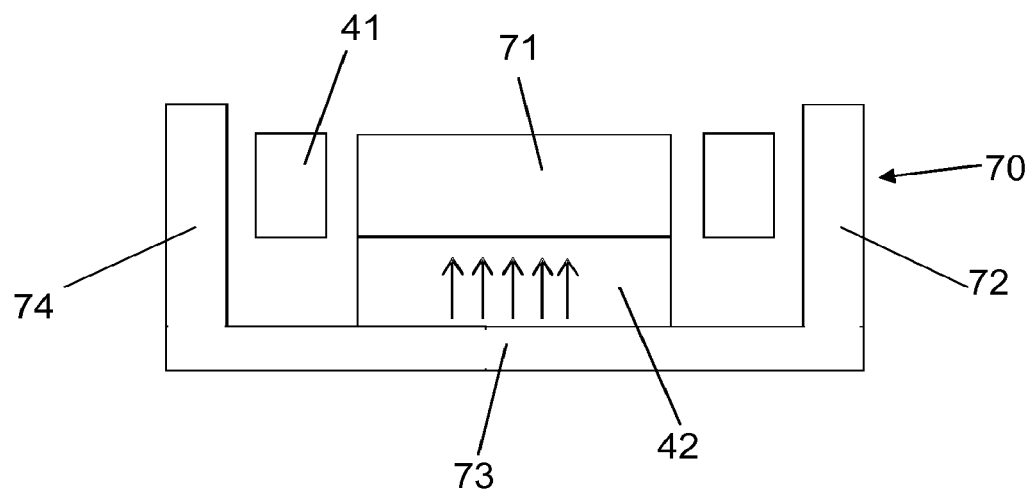

As shown in FIGS. 22 and 23, other magnetic flux guiding structures 70 are also possible. FIG. 22 shows a further structure 70 with two opposing magnets 42, 42' (i.e. magnet 42 faces magnet 42') which is a modification of the structure 70 shown in FIG. 21. In FIG. 22, the third arm 73 further extends towards a fourth arm 75 running parallel to the first arm 72 and to the second arm 74, wherein the second arm 74 now protrudes from the center of the third arm 73 and is arranged between the first and the fourth arm 72, 75. The further magnet 42' is arranged adjacent to the fourth arm 75 and between the fourth arm 75 and the second arm 74, wherein the magnetization of the further magnet 42 points towards the second arm 74.

Further, the structure 70 shown in FIG. 23 is a modification of the structure 70 shown in FIG. 21. In FIG. 23, the magnet 42 is arranged on the third arm 73, wherein said end region 71 that receives the associated coil 41 is arranged on top of the magnet 42, wherein the magnetization of the magnet 42 now points towards said end region 71 of the structure 70.

In order to detect the actual spatial position of the optical element 20/plate 300, the lens device 1 comprises a position sensor means 60. This sensor means 60 can be formed as a hall sensor 62 that is arranged on the plate 300, particularly on the second side 300b of the plate 300 and senses an associated signal magnet 61 connected to the carrier 50, which signal magnet 61 faces or opposes its associated hall sensor 62. Particularly, the respective signal magnet 61 is arranged radially outward relative to the associated hall sensor 62.

The lens device 1 may comprise for such pairs of hall sensors 62 and signal magnets 61, wherein the signal magnets 61 are equally spaced along the periphery of the carrier 50. Likewise, the hall sensors 62 are equally spaced along the periphery of the plate 300.

Of course, also other position sensor means can be employed such as capacitive sensors, magneto-resistive sensors, or strain sensors.

Figure 16:
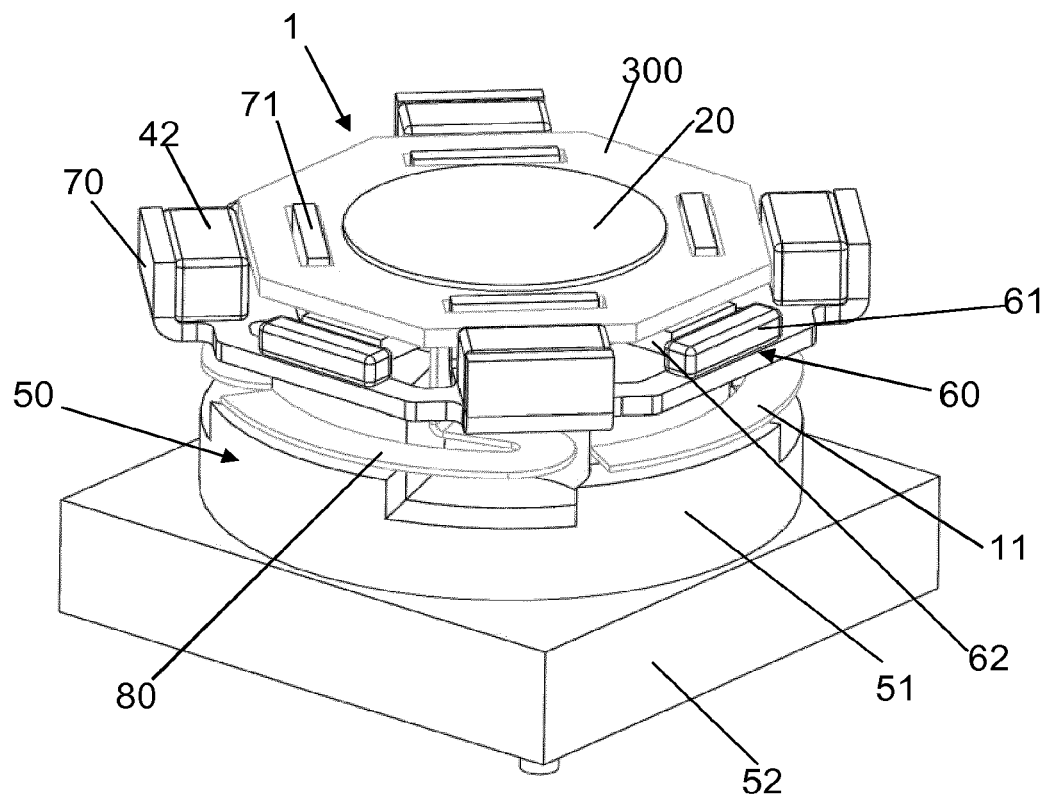
FIGS. 16-18 show different views of a further lens device according to the invention having a transparent optical element.
Figure 17:
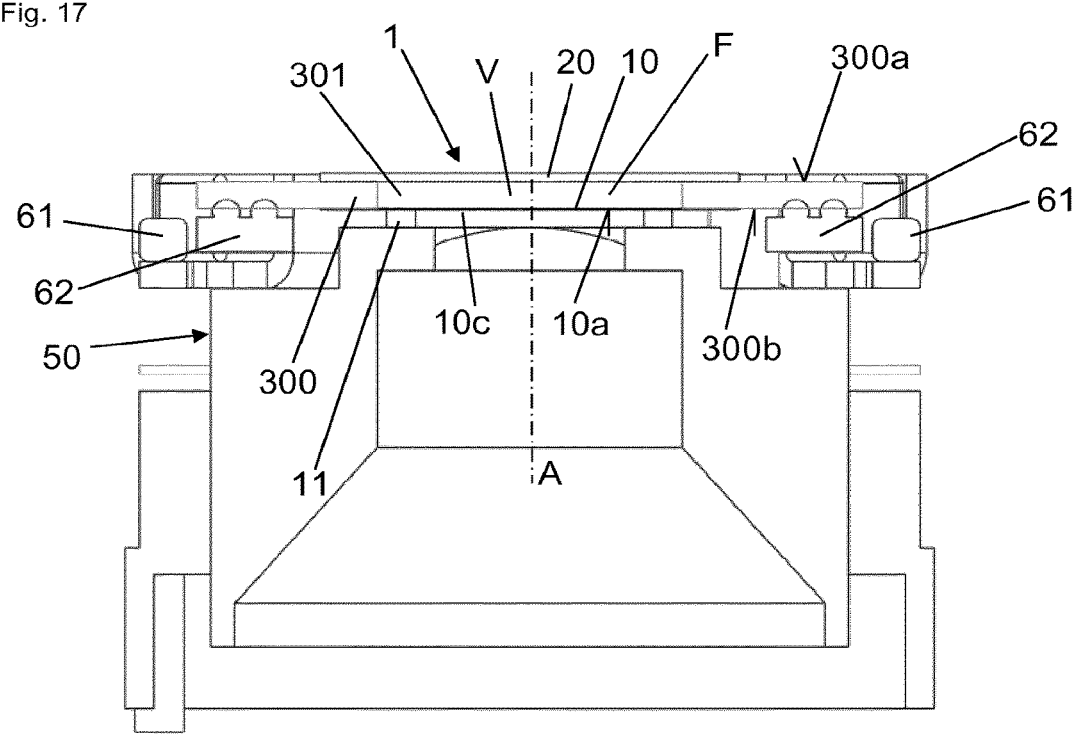
Figure 18:
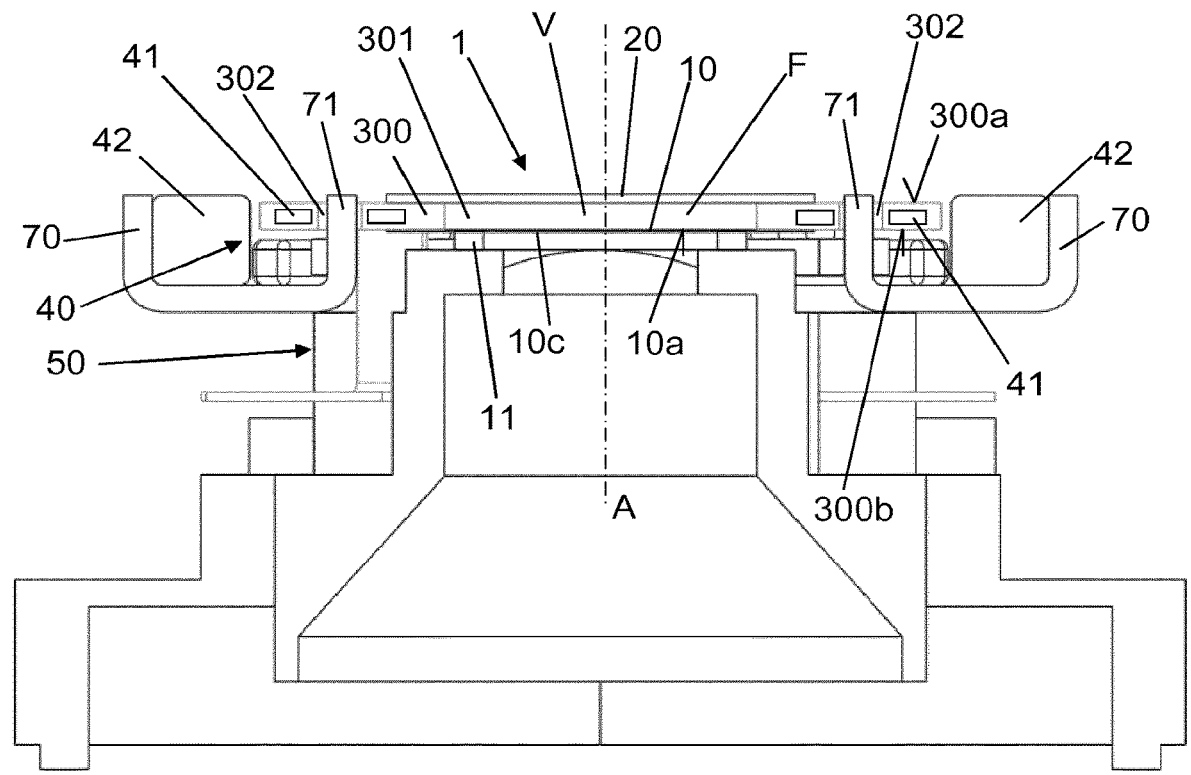

FIGS. 16 to 18 show a further lens device 1, which may form part of camera, particularly of a camera of a mobile phone. The lens device 1 is designed as described with respect to FIG. 13 to 15 with the difference that the bellows 30 is now omitted. Here, the membrane 10 is directly attached to the second side 300*b* of the plate 300 as can be seen from FIG. 17, for instance.

As Indicated in FIG. 16, electrical connections to the coils 41 and/or position sensor means 62 on the plate 300 may be made by means of flexible wires 80, which provides a way for measuring the spatial position of the optical element 20/plate 300 by means of strain sensors, wherein such a strain sensor is attached to each flexible wire 80. In case the spatial position of the plate 300 is altered by means of the actuator means 40 (see above), the flexible wires 80 will be deformed which can be detected by means of said strain sensors.

Figure 19:
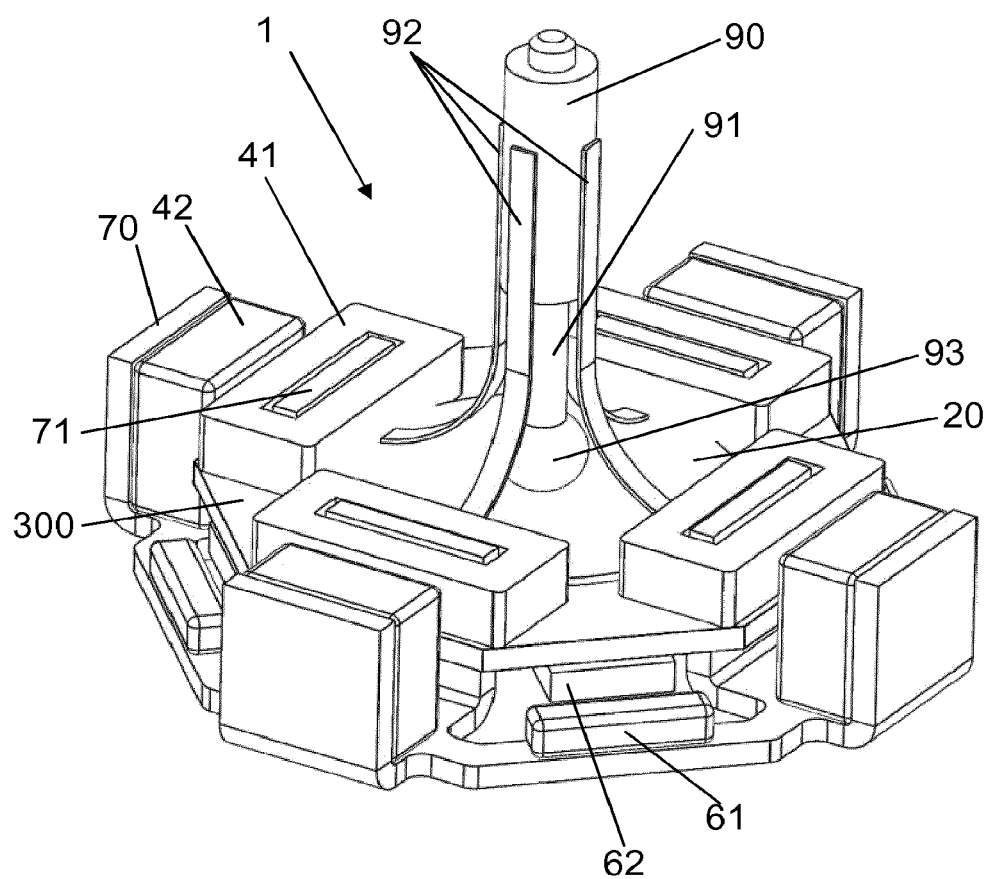
FIG. 19-20 show different views of a further lens device according to the invention having an optical element in the form of a mirror.
Figure 20:
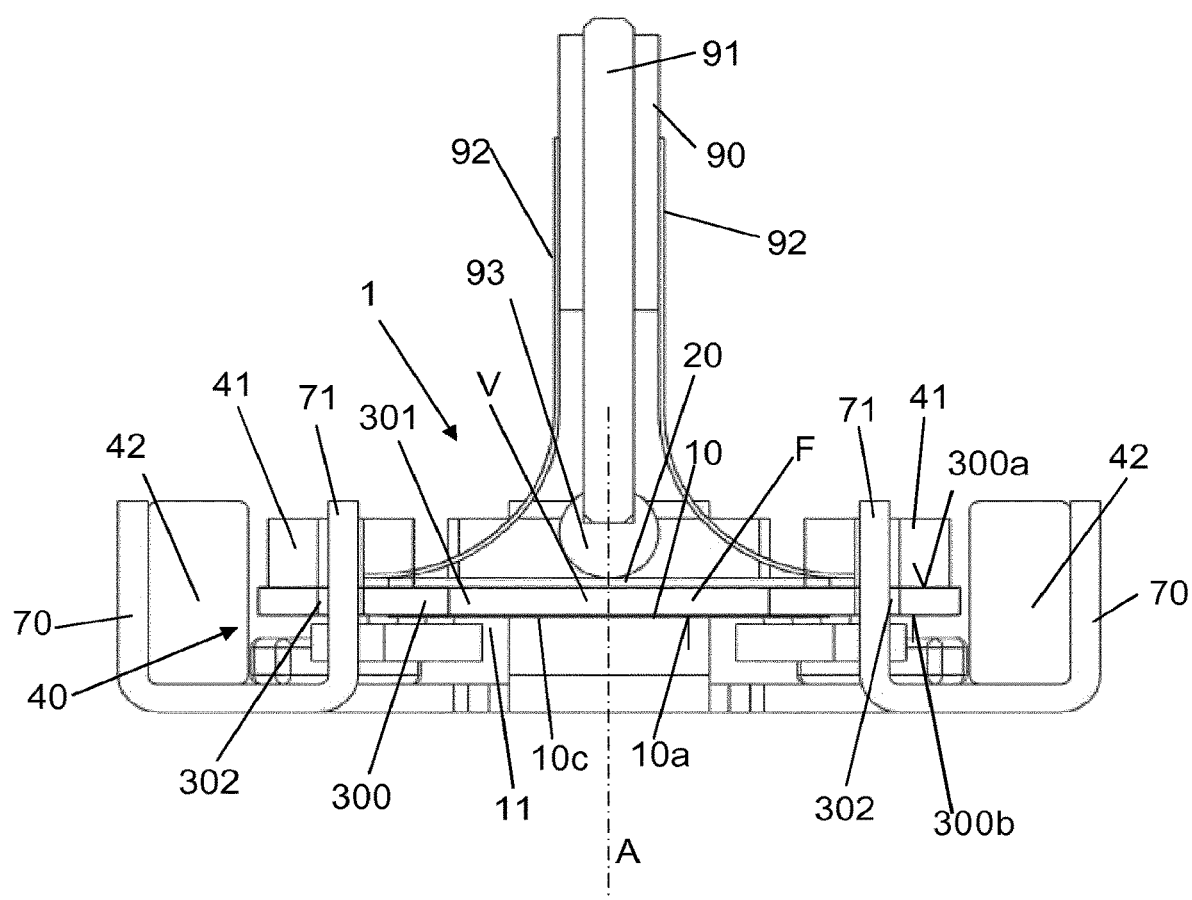

Finally FIGS. 19 and 20 show a further lens device 1 according to the invention which is constructed as described with respect to FIGS. 16 to 19 with the difference that the optical element 20 is now formed as a mirror having a reflecting surface that faces the volume V of the tunable lens. Further, in contrast to FIGS. 16 to 19, the coils 41 are arranged on the first side 300*a* of the plate 300.

The lens device 1 shown in FIGS. 19 to 20 may form part of a 3D scanner for scanning images. In order to safely guide the movement of the plate 300 which has already been described above, the plate 300 is connected via a joint 93 in the form of a ball bearing to an elongated pin 91 that is slidably arranged in a bushing 90. Preferably, the bushing 90 is connected to a housing of the lens device 1 and/or to said carrier 50. Further electrical connections to the plate 300 are preferably made by means of four flexible wires 92 which extend from the wall member 300, particularly from the coils 41. The flexible wires 92 comprise some slack so that they do not interfere with a movement of the plate 300. Preferably, the flexible wires 92 extend from the plate 300 towards the bushing 90 where they are fastened to the bushing 90.

Figure 24:
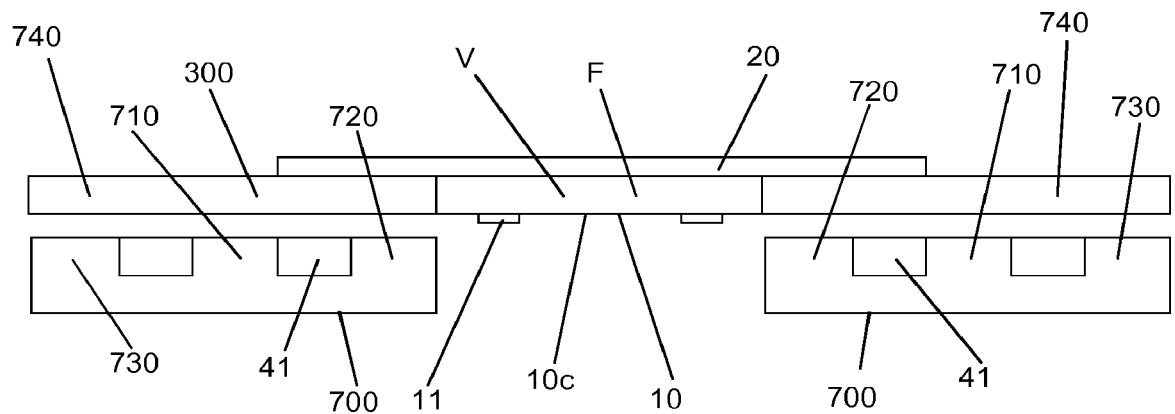
FIG. 24-26 show schematic views of further actuator means that can be used in the framework of the present invention.
Figure 25:
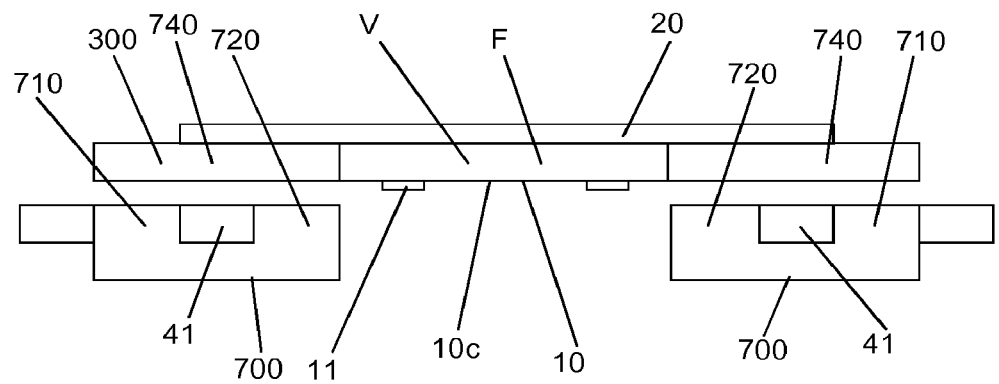

A further embodiment of an actuator means that can be used to axially move and/or tilt the plate 300/optical element 20 of the lens device 1 is shown in FIG. 24. According thereto the actuator means comprises a plurality, particularly, two, three or four, electrically conducting coils 41 rigidly connected to the carrier 50. Preferably, the coils 41 are each arranged adjacent to an associated magnetic flux return structure 700 (e.g. out of a magnetically soft material such as e.g. steel). The magnetic flux return structure 700 may comprise regions 720, 730 extending laterally on either side of the respective coil 41 as well as a region 710 protruding into the respective coil 41. A modification is shown in FIG. 25 where each magnetic flux return structure 700 has a region 720 extending laterally, namely radially farther inward than the respective coil 41, as well as a region 710 protruding into the respective coil 41. Here, each coil 41 has a region protruding beyond the plate 300 in the extension plane of the plate 300 which respective region of the coil 41 is not flanked by a region of the return structure.

The actuator means further comprises a corresponding plurality of magnetic flux guiding structures 740 arranged in or on the plate 300, wherein each magnetic flux guiding structure 740 is associated to a different coil 41, and faces or opposes the respective coil 41/magnetic return structure 700 such that a gap is present between the respective return structure 700/coil 41 on one side and the associated magnetic flux guiding structure 740 on the other side. The plurality of magnetic flux guiding structures 740 can also be made out of one magnetically soft part. The same is true for the return structure 700. I.e. there may also be a single magnetic flux guiding structure facing or opposing the coils which are arranged adjacent a single magnetic flux return structure 700.

When a current now flows through the coils 41, the magnetic flux is guided through the respective return structure 700 and the respective flux guiding structure 740. Since the system wants to reduce the magnetic resistance, the respective magnetic flux guiding structure 740 will be attracted to the associated return structure 700 to reduce the gap between the two magnetically soft structures and to reduce the resistance for the magnetic flux. Thus, the plate 300 and optical element 20 are moved. Depending on the current in the respective coil 41 this allows one to move the plate 300 axially along said axial direction and/or to tilt the plate 300 with respect to the plane spanned/defined by the lens shaping member 11. Such an actuator means is also denoted as reluctance actuator.

This embodiment of an actuator means has the advantage that the coil 41 and the Hall sensor 62 can be mounted on the carrier 50 (cf. for example FIG. 16), i.e., at a fixed position with respect to the lens barrel of the fixed optics 51 and no flex connection 80 is required. Furthermore, less components are required. In this case, the signal magnet 61 would be attached to the moveable/tiltable plate 300 that comprises or is formed by the flux guiding structures 740. Furthermore, no permanent magnets (except for the Hall sensor) are required. The drawback is that only attractive forces are possible. Furthermore, the Hall sensor can be replaced by directly sensing the variable reluctance of the reluctance actuator, associated to the changing gap between the flux guiding structure 740 and the return structure 700.

Figure 26:
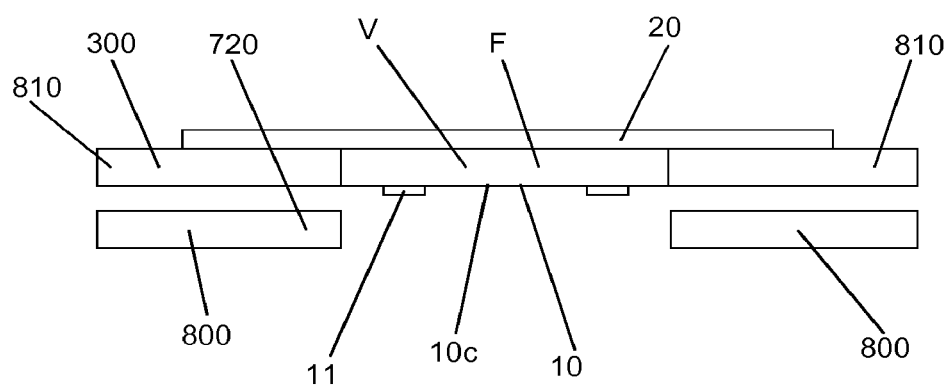

According to yet another embodiment of an actuator means that can be employed to axially move and/or tilt the plate 30/optical element 20 as shown in FIG. 26, the actuator means may comprise a plurality of first (top) electrodes 810, particularly, two, three or four, arranged in or on the plate 300, as well as a corresponding plurality of second electrodes 800 rigidly connected to the carrier 50, wherein each first electrode 810 is associated to a different second electrode 800 and faces or opposes the respective second electrode 800 so that a gap is present between the respectively associated electrodes 810, 800. By applying a voltage between the respective first and second electrodes 810, 800, the plate 300/optical element 20 can be axially moved and or tilted with respect to said plane spanned/defined by the lens shaping member 11. Thus, besides a magnetic actuation, also an electrostatic actuation is possible. Furthermore, the actuator electrodes 810, 800 can be used to sense the distance between the electrodes by reading out the capacitance value between the electrodes.

Figure 27:
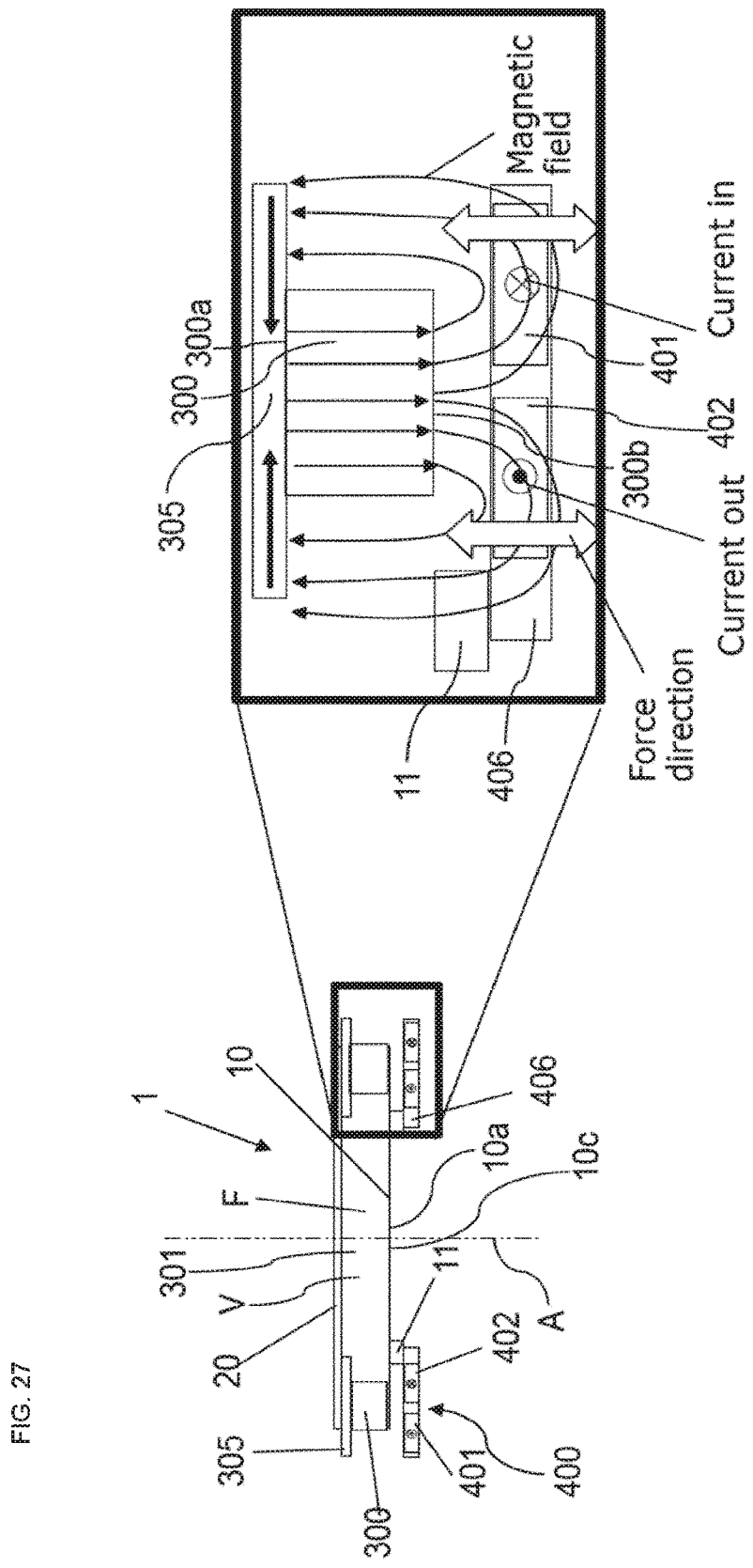
FIG. 27 shows a schematic cross sectional view as well as detail of a lens device according to the invention having an actuator means using a coil with two sections facing an annular magnet.

FIG. 27 shows a schematical cross sectional view of a further tunable lens device 1 according to the invention. As before, the lens device 1 comprises a transparent and elastically expandable membrane 10, a transparent (e.g. planar) optical element 20 facing or opposing the membrane 10, a wall member 300 in the form of an annular magnet 300 having a continuous circular recess 301 formed therein in the center of the magnet 300, which recess 301 extends from a first side 300*a* of the magnet 300 to a second side 300*b* of the magnet 300, wherein the second side 300*b* of the magnet faces away from its first side 300*a*. Furthermore, the magnet 300 is axially magnetized (in the axial direction A). The rigid optical element 20 is connected to the first side 300*a* of the magnet 300 via a plate-like annular magnetic flux return structure 305 that serves for guiding returning magnetic flux back to the magnet 300 and that is positioned between the optical element 20 and the magnet 300. Said membrane 10 is connected to the second side 300b of the magnet such that a volume or container V is formed that is at least delimited by the membrane 10, the optical element 20, said magnet 300 forming a circumferential wall member 300 of said container, and the return structure 305 (which also forms part of the container wall). As described before, the volume V is completely filled with a transparent fluid F. The optical element 20, said volume V with the fluid F residing therein and the membrane 10 form a tunable lens. For adjusting the curvature, particularly the focus of this lens, the lens device 1 further comprises a lens shaping member 11 that is attached to an outside 10a of the membrane 10, which outside 10a faces away from said volume V. The lens shaping member 11 thereby delimits an optically active and elastically expandable (e.g. circular) region 10c of the membrane 10, wherein particularly said region 10c extends up to an (e.g. circumferential) inner edge of the lens shaping member 11, and wherein particularly said region 10c comprises said curvature of the membrane 10 to be adjusted. The lens shaping member 11 may be formed as an annular (e.g. circular) frame for generating a spherical tunable lens, but may also have any other geometry (see above).

Further, the lens device 1 comprises an actuator means 40 that is shown in the detail on the right hand side of FIG. 27. Said actuator means 40 is designed to generate an axial movement of the optical element with respect to an axial direction A running perpendicular to the plane defined by the lens shaping member 11. Thus, the lens device 1 may be used in an autofocus application where the focus of the lens (i.e. the curvature of the membrane 10) may be controlled as described before by moving the optical element 20 with respect to the lens shaping member 11 in the axial direction.

For this, besides said magnet 300, the actuator device 40 comprises a coil 400 that is carried by an annular coil frame 406 that faces the second side 300b of the magnet 300 and is coaxially arranged with respect to the magnet 300. The lens shaper 11 is connected to the coil frame 406, particularly integrally, and protrudes from the coil frame 406 towards the membrane 10 so as to contact it as described above. Further, the coil frame 406 surrounds a recess being aligned with the recess 301 of the magnet 300, so that light can pass the volume V and the coil frame 406 in the axial direction A.

Figure 28:
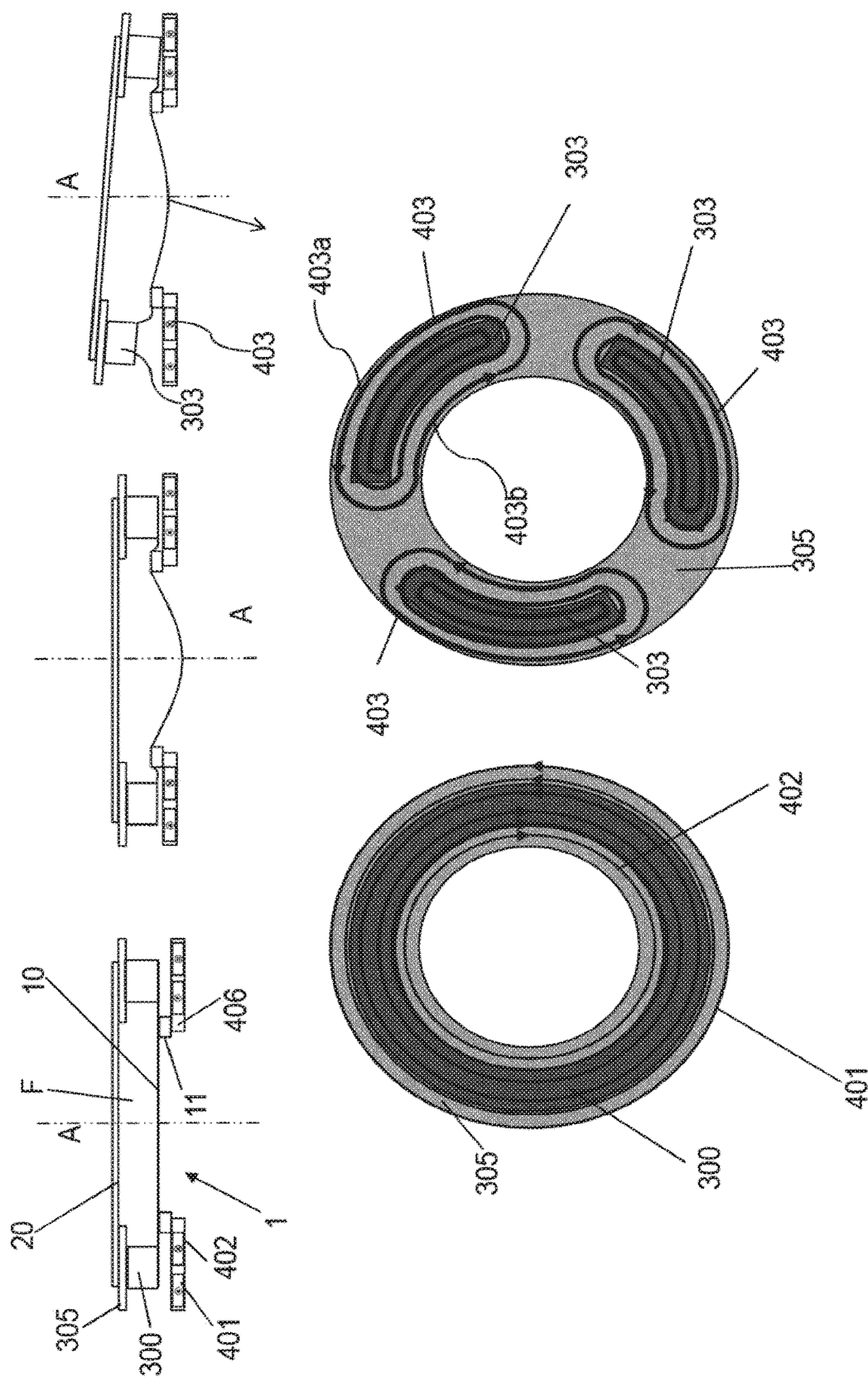
FIG. 28 shows schematical views of the lens device shown in FIG. 27 as well as a modification of this lens device allowing for tilting of the optical element.

As shown in FIG. 28, particularly on the lower left hand side, the coil 400 extends circumferentially in the coil frame 406 and also extends along the magnet 300 (coaxially with the magnet 300) and faces the second side 300b of the latter so that the magnet 300 is arranged between the coil 400 and the magnetic flux return structure 305.

Further, in the embodiment shown in FIG. 27 and in the lower left hand side of FIG. 28 as well as in the upper left hand side of FIG. 28, the coil 400 comprises a conductor that is wound around a coil axis that coincides with the axial direction A (i.e. runs perpendicular to said plane or to said lens shaping member 11), wherein the coil 400 comprises an outer first section 401 surrounding an inner second section 402 of the coil 400, wherein the conductor is wound around said coil axis such that each of said two sections 401, 402 of the coil 400 extends along the magnet 300 and faces the second side 300b of the magnet 300. Now, as indicated in FIG. 28 on the lower left hand side, in said first section 401 the conductor has a winding direction that is opposite to the winding direction of the conductor in the second section 402 of the coil 400, so that when a current is applied to the coil 400, the current flows in one direction in the first section 401 (out of the plane of projection) and in the opposite direction in the second section 402 (Into the plane of projection) of the coil 400. This generates a Lorentz force that causes the magnet 300 and the coil 400 to attract each other or to repel each other in a very efficient manner as indicated on the right hand side of FIG. 27, depending on the direction of the current in said sections 401, 402 of the coil 400. By means of such a magnet-coil configuration, the optical element 20 can be moved towards and away from the lens shaping member 11 in the axial direction A, i.e. for increasing the curvature of the membrane 10 so as to alter the focus of the lens as indicated in FIG. 28 in the upper middle panel for instance.

A modification of this magnet-coil configuration is shown on the lower right hand side of FIG. 28. This modification also allows to—besides moving the optical element axially as it is needed for instance when the lens device 1 is used as an autofocus lens—to tilt the optical element 20 with respect to said plane (i.e. the lens shaping member 11). In this modification, instead of a single magnet 300, the actuator means 40 of the lens device 1 comprises a plurality of magnets 303, e.g. three magnets 303 as shown on the lower right hand side of FIG. 28, which are arranged along the annular return structure 305, namely around the volume V, so that they are e.g. evenly spaced along the periphery of the return structure 305 or volume V (or in other words arranged around the central axis A of the optical device 1). All three magnets 303 are magnetized in the axial direction A. Here, each magnet 303 comprises a first and a second side 303a, 303b which second side 303b faces away from the first side 303a, wherein the return structure 305 is connected to the first side 300a while the membrane 10 is attached to the second sides 303b of the magnets 303. The magnets 303 may be embedded into the return structure 305 or the latter may simply be connected to the first sides 303a of the magnets 303. The magnets 303 form part of a wall member 300 that surrounds the fluid filled volume V of the lens. As indicated on the lower right hand side of FIG. 28, the second sides 303b of the magnets 303 may further each comprise a certain contour such as an elongated curved contour which follows the contour of a section of the annular (circular) return structure 305 to which the respective magnet 303 is attached.

Now, instead of a single coil 400, the lens device 1 comprises a plurality of coils 403 (here e.g. three coils 403) corresponding to the number of magnets 303, wherein each coil 403 of the plurality of coils is associated to a different magnet 303, wherein the respective coil 403 faces the associated magnet 303 in the axial direction A.

Particularly, each of said coils 403 comprises an outer contour that mimics the contour of the second side 303b of the associated magnet 303, e.g., each coil may comprise an elongated, curved contour, so that in an outer half 403a of the respective coil 403 the current flows in a first direction along the associated magnet 303 while it flows in the opposite direction in the other inner half 403b of the respective coil 403. Thus, when a current is applied to one of the coils 403, a Lorentz force is generated that causes the associated magnet 303 and said coil 403 to attract each other or to repel each other depending on the direction of the current in said coil 403. This allows to tilt the optical element 20 with respect to a plane spanned by the lens shaping member 11 or with respect to the lens shaping member 11 itself, which allows one to give the volume V under the optical element 20 the form of a prism, such that light that passes the volume V is deflected as indicated in FIG. 28 in the upper right hand panel. This can be employed e.g. for image stabilization as described above. Of course, in case all coils 403 are actuated in a symmetric fashion, the curvature of the membrane 10 can be altered in addition due to an axial movement of the optical element 20 with respect to the lens shaping member 11 so that an autofocus function can be combined with image stabilization.

Unless not stated otherwise, the above described magnet-coil configurations (single coil and single magnet as well as multiple coils and magnets) can both be applied to the embodiments that will be described below. Furthermore, it is also possible to have a configuration with a single magnet and multiple coils.

Figure 29:
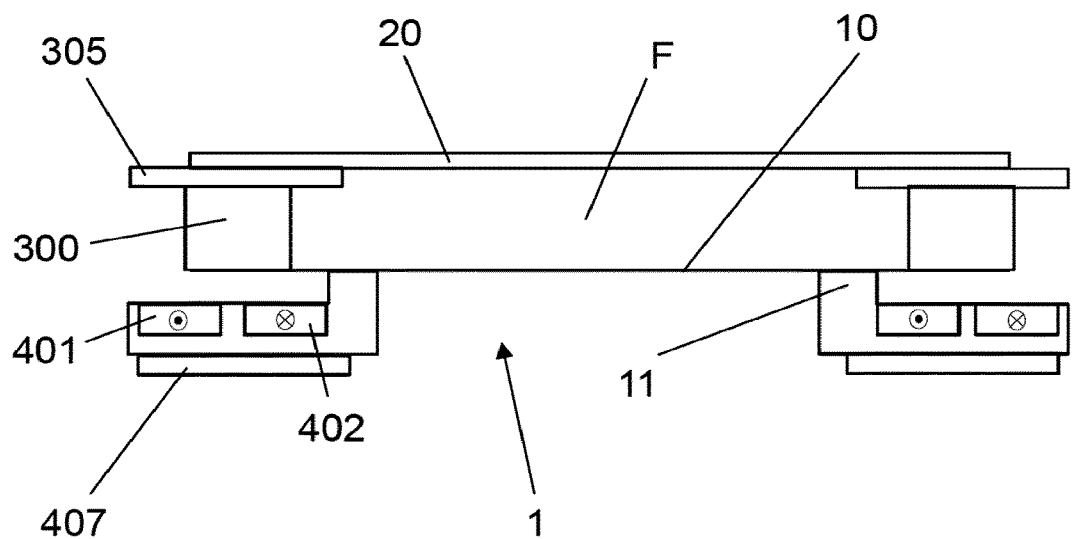
FIG. 29 shows a schematical view of a lens device as shown in FIG. 28 having an additional field guiding plate.

FIG. 29 shows a modification of the embodiments shown in FIGS. 27 and 28, wherein in addition to these embodiments, the lens device 1 according to FIG. 29 comprises an annular field guiding plate 407 that is arranged coaxially with respect to the coil frame 406 on a side of the coil frame 406 that faces away from the magnet 300. When the magnet 300 is moving down towards the coil 400 due to the Lorenz force created by a current through the coil 400, the magnet 300 starts to get attracted more and more to the field guiding plate 407. This attractive force helps to deform the membrane 10, supporting the Lorenz force and therefore makes the lens device 1 more efficient. Furthermore, the field guiding plate 407 also helps to magnetically shield the device 1.

Figure 30:
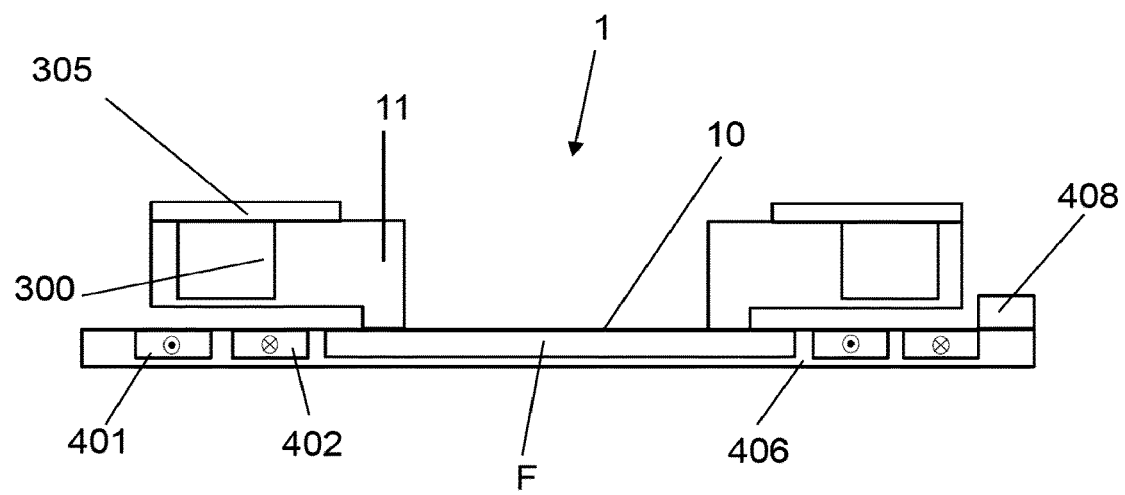
FIG. 30 shows a schematical cross sectional view of a lens device according to the invention, wherein the lens shaping member is connected to the magnet of the actuator which moves the magnet with respect to at least one coil held by a wall member that also holds the fluid with help of the membrane and the optical element being attached to the wall member, respectively.

FIG. 30 shows a further lens device 1 according to the invention. Here, in contrast to FIGS. 27 to 29, the annular magnet 300 to which first side 300a the return structure 305 is connected is connected to the lens shaping member 11 which protrudes downwards from the magnet 300 towards the membrane 10 and contacts the membrane 10 from above, which membrane 10 in turn is connected to a circumferential wall member 406 which also carries the coil 400 (or coils 403) that face the second side 300b of the magnet 300. Here, the circumferential wall member 406 together with the membrane 10 and the optical element 20 which is connected to or an integral part of the wall member 406 (e.g. a multi-layer printed circuit board) on a side facing away from the side of the wall member 406 to which the membrane 10 is connected, form a container of volume V for the fluid F. For detecting a movement of the magnet 300 that may be used for controlling the actuator means 40 as described above, a Hall sensor 408 is provided that may be arranged on the wall member 406. In the embodiment shown in FIG. 29, the magnet 300 and the lens shaping member 11 connected thereto is axially moved and/or tiled by the actuator means with respect to the optical element 20 as described above, while in FIGS. 27 to 29 it is the other way around.

Figure 31:
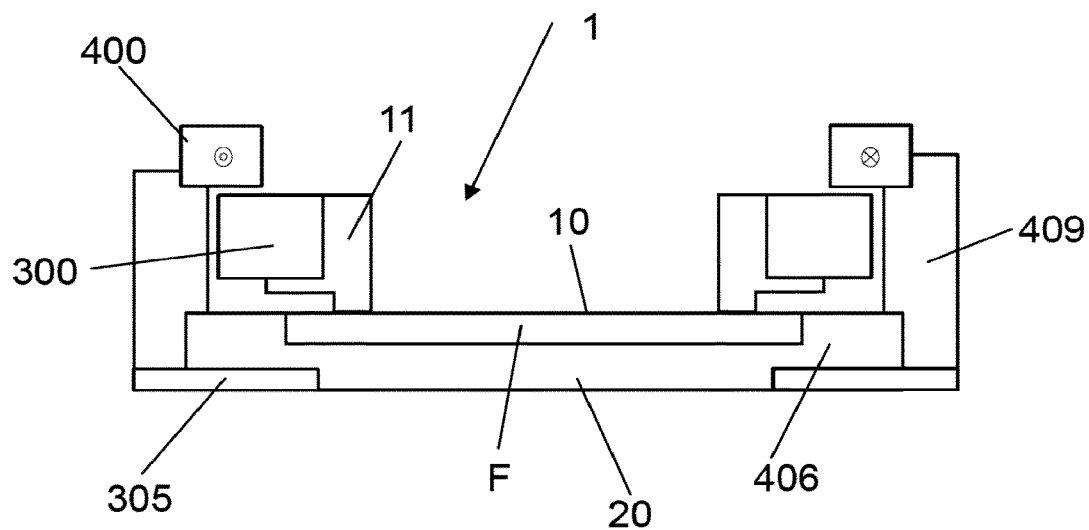
FIG. 31 shows a cross sectional view of a lens device according to the invention which is a modification of the lens device shown in FIG. 30.

FIG. 31 shows a modification of the embodiment shown in FIG. 30, wherein in contrast to FIG. 30, the coil 400, being a coil of uniform winding direction, is arranged on the first side 300a of the annular magnet 300, while the return structure is arranged on the second side 300b of the magnet 300. Here, the coil 400 is connected to the return structure 305 via an axially extending spacer 409 that surrounds the magnet 300.

Figure 32:
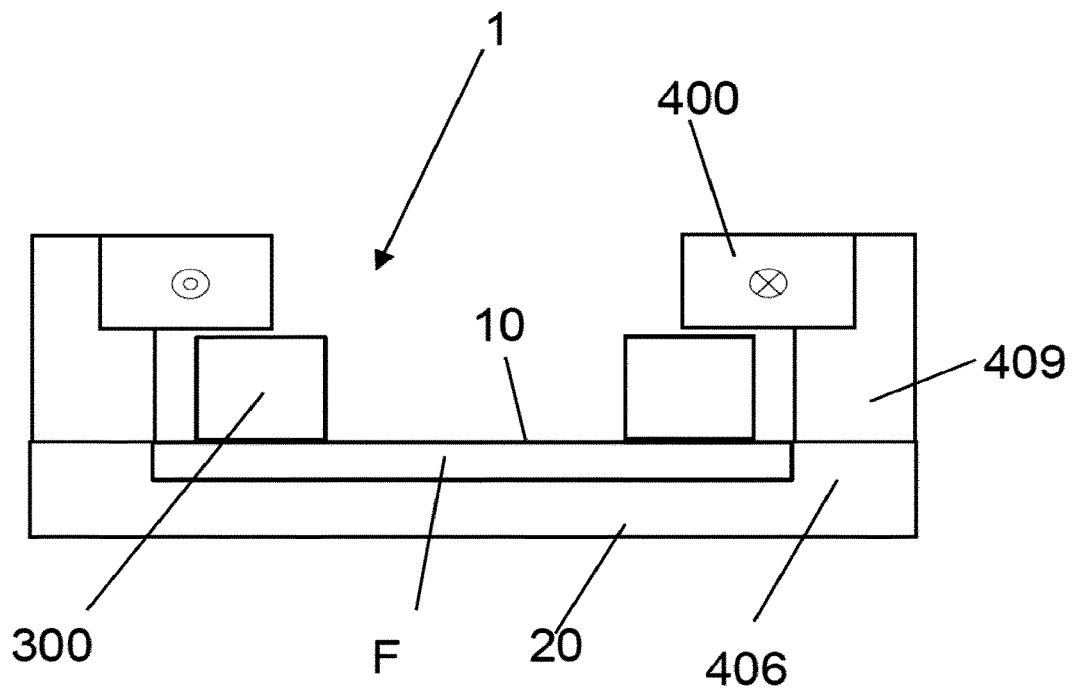
FIG. 32 shows a cross sectional view of a lens device according to the invention which is a modification of the lens device shown in FIG. 31.

Further, FIG. 32 shows a modification of the embodiment shown in FIG. 31, wherein the return structure 305 is omitted and the lens shaping member 11 is formed by the annular magnet 300 itself.

Figure 33:
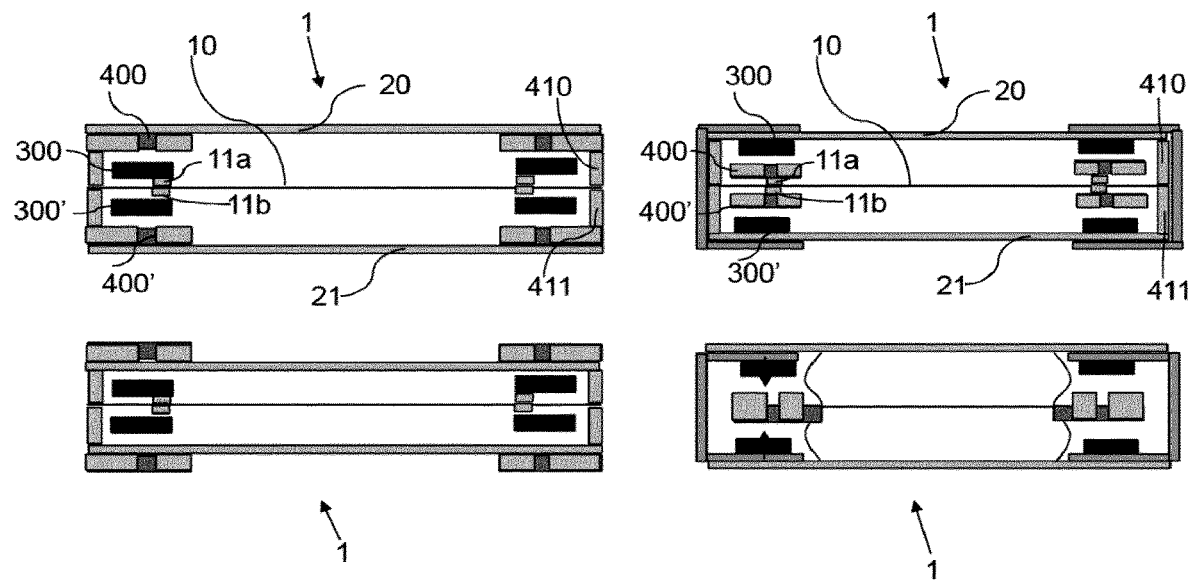
FIG. 33 shows schematical cross sectional views of four different lens devices according to the invention having two volumes filled with a fluid (so called double liquid lenses)

FIG. 33 shows four different ways of arranging magnets 300 and coils 400 with respect to the membrane 10 in a configuration with one deformable membrane 10 and two liquid volumes V, V'. By selecting two liquids F, F' with different refractive indices but similar density, a gravity insensitive lens can be built.

Figure 34:
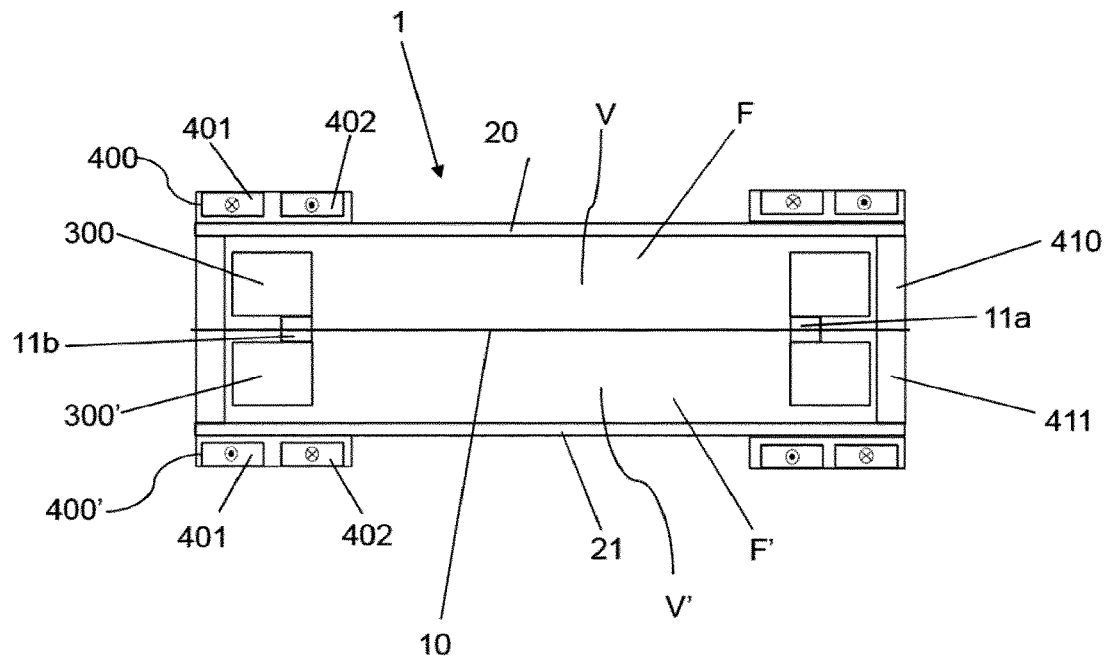
FIG. 34 shows a schematical cross sectional view of a lens device shown in FIG. 33.

FIG. 34 shows the configuration shown in FIG. 33 on the lower left hand side in detail. Here, the membrane 10 is arranged between an annular top lens shaping member 11a contacting the membrane 10 from above and an (e.g. identical) bottom lens shaping member 11b contacting the membrane 10 from below. The membrane 10 is further held between a circumferential top spacer 410 and a circumferential bottom spacer 411, wherein an optical element 20 in form of a transparent top glass 20 is connected to the top spacer 410, so that the top spacer 410, the top glass 20, and the membrane 10 form a (top) volume V being filled with a (top) fluid F, and wherein a further optical element 21 in the form of a transparent bottom glass 21 is connected to the bottom spacer 411, so that the bottom spacer 411, the bottom glass 21, and the membrane 10 form a (bottom) volume V being filled with a (bottom) fluid F'. Now, In order to deform the membrane 10 according to the principles described above, the top lens shaping member 11a is connected to an annular top magnet 300 residing in the volume V, and the bottom lens shaping member 11b is connected to an annular bottom magnet 300' that faces the top magnet 300 in the axial direction A and is arranged coaxially with respect to the top magnet 300, wherein the two lens shaping members 11a, 11b are arranged between the two magnets 300, 300' in the axial direction A. Furthermore, the two magnets 300, 300' are axially magnetized (in the axial direction A). Here, each of the magnets 300, 300' can be actuated with an associated coil, namely top coil 400, and bottom coil 400', which may each be arranged on or embedded into a printed circuit board (PCB), wherein the top coil 400 associated to the top magnet 300 may be arranged on the top glass 20 so that it faces the top magnet 300, and wherein the bottom coil 400' associated to the bottom magnet 300' can be arranged on the bottom glass 21 so that it faces the bottom magnet 300'. Particularly, the magnets 300, 300' and associated coils 400, 400' can be configured as described above with respect to FIGS. 27 and 28. In case the top and bottom coil 400, 400' are connected such that both coils 400, 400' cause the magnets 300, 300' to move up or down, a very efficient actuation of the magnets can be achieved.

Figure 35:
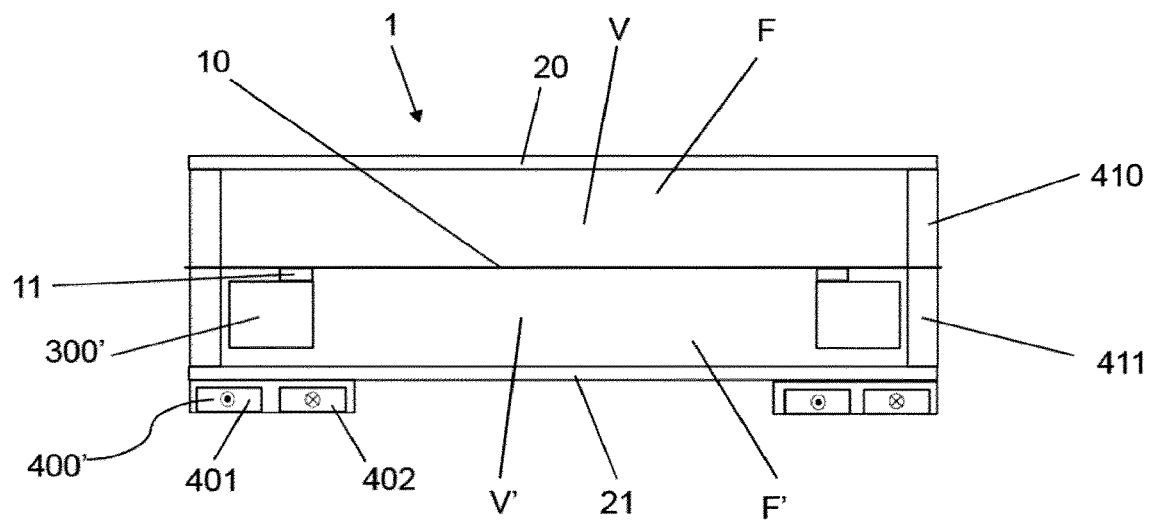
FIG. 35 shows a modification of the lens device shown in FIG. 34.

Further, FIG. 35 shows a modification of the embodiment shown in FIG. 34, wherein in contrast to FIG. 34, the top magnet 300, top lens shaping member 11a and the top coil 400 are omitted.

Figure 36:
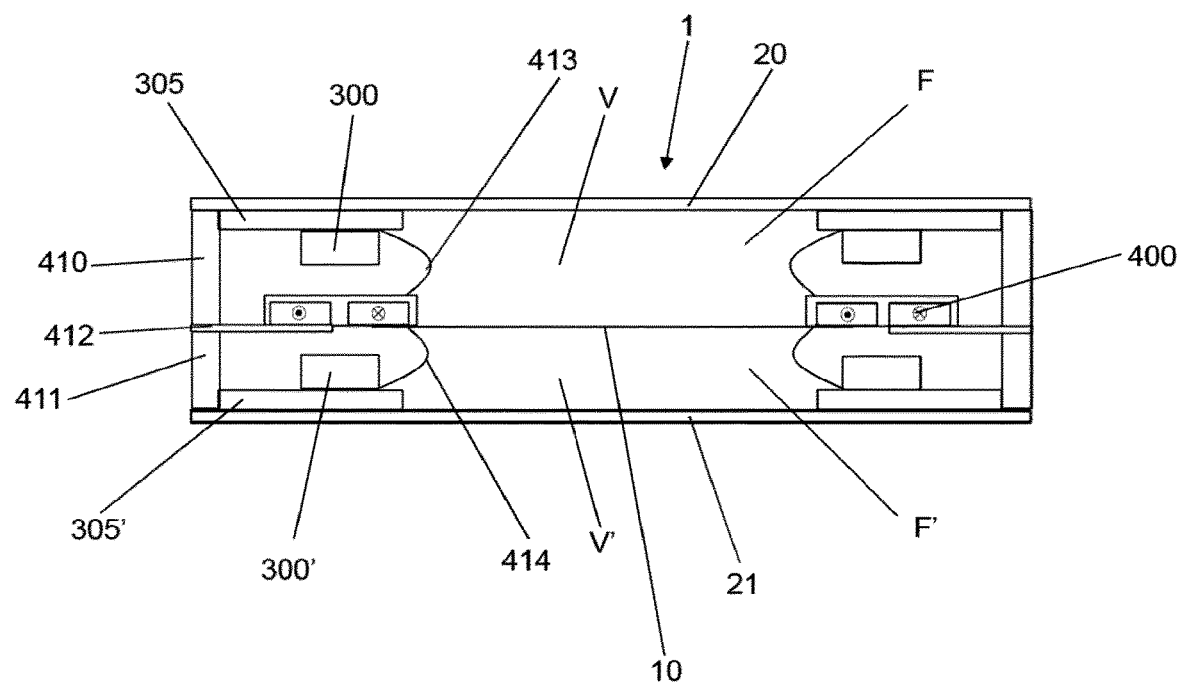
FIG. 36 shows a schematical cross sectional view of a lens device shown in FIG. 33.

FIG. 36 shows the configuration shown on the lower left hand side of FIG. 33 in detail. Here, the annular lens shaping member 11 contacting the membrane 10 from above also functions as a coil frame for carrying the coil 400 which is embedded into the lens shaping member 11. In order to provide electrical connections to the coil(s) 400, the lens shaping member 11 is connected to a contact spring 412 via which the lens shaping member is connected to a circumferential top spacer 410 and to a circumferential bottom spacer 411. Further, in the axial direction A, the lens shaping member/coil frame 11 is arranged between an annular top magnet 300 and an annular bottom magnet 300', wherein the top magnet 300 is connected to a top return structure 305 which in turn is connected to a top glass 20 that is connected to the top spacer 410, and wherein the bottom magnet 300' is connected to a bottom return structure 305' which in turn is connected to a bottom glass 21 that is connected to the bottom spacer 411. The top magnet 300 and bottom magnet 300' are both magnetized in the axial direction A. Now, a circumferential deformable top wall (e.g. In the form of a top bellows) 413 extends from the top magnet 300 towards the lens shaping member 11 so that a top volume V is formed that is filled with a top fluid F and that is delimited by the top glass 21, the top bellows 413 and the membrane 10. Likewise, a circumferential deformable bottom wall (e.g. in the form of a bottom bellows) 414 extends from the bottom magnet 300' towards the lens shaping member 11 so that a bottom volume V' is formed that is filled with a bottom fluid F' and that is delimited by the bottom glass 21, the bottom bellows 414 and the membrane 10.

In the embodiments having two volumes V, V and fluids F, F' therein, the fluids can be different in refractive index but similar in density. Particularly, the further (bottom) fluid F' can be one of the fluids described above. The particular advantage of having two fluid-filled volumes and a membrane 10 there between is the fact that gravity induced coma can be almost completely removed and the lens is much less shock sensitive.

Also here, the lens shaping member 11 can be moved to deform the membrane 11 using the coil 400 and the magnets 300, 300' according to principles described above.

Finally, the embodiments shown on the upper left hand side and the upper right hand side of FIG. 33 are modifications of the embodiment shown in FIG. 34, wherein the embodiment shown on the upper left hand side of FIG. 33 corresponds to the embodiment of FIG. 34 with the difference, that the top coil 400 is arranged in the top volume V adjacent to the top glass 20, and the bottom coil 400' Is arranged in the bottom volume adjacent the bottom glass 21. Further, the embodiment shown in FIG. 33 in the upper right hand side corresponds to the embodiment shown in the upper left hand side, but now the top coil has changed position with the top magnet, while the bottom coil has changed position with the bottom magnet.

The invention claimed is:

1. An actuator comprising:
   an electrically conducting coil arranged on or integrated into a wall member, wherein the electrically conducting coil is arranged adjacent to a magnetic flux return structure;
   a magnet connected to a carrier, wherein the magnet interacts with the electrically conducting coil such that when a current is applied to the coil the coil is either moved towards the carrier along an axial direction or away from the carrier along the axial direction depending on a direction of the current within the coil; and
   a magnetic flux guiding structure connected to the carrier, wherein magnetic flux is guided through the flux return structure and the flux guiding structure.

2. The actuator according to claim 1, wherein the magnetic flux return structure is made out of a magnetically soft material.

3. The actuator according to claim 2, wherein the magnetically soft material is steel.

4. The actuator according to claim 1, wherein the actuator is a reluctance actuator.

5. The actuator according to claim 4, wherein the actuator is arranged to detect the spatial position of the wall member.

6. The actuator according to claim 5, wherein the actuator directly senses a reluctance of the reluctance actuator associated to a gap between the magnetic flux guiding structure and the flux return structure.

7. The actuator according to claim 5, further comprising a position sensor using a high frequency current signal for measuring a spatial position of the wall member via the electrically conducting coil.

8. The actuator according to claim 6, further comprising a position sensor using a high frequency current signal for measuring a spatial position of the wall member via the electrically conducting coil.

9. The actuator according to claim 1, wherein the magnet comprises a first magnet and a second magnet connected to the carrier, wherein the first magnet is associated with the electrically conducting coil.

10. The actuator according to claim 9, further comprising a second electrically conducting coil, wherein the second magnet is associated to the second electrically conducting coil.

11. The actuator according to claim 10, further comprising an optical element, wherein the first magnet and the second magnet is each magnetized perpendicular with respect to a plane along which the optical element extends.

12. The actuator according to claim 10, wherein the first magnet and the second magnet are each magnetized in an identical direction.

13. The actuator according to claim 11, wherein the electrically conducting coil comprises a conductor that is wound around a coil axis running perpendicular to the plane, the coil axis coincides with a cylinder axis of the first magnet, and the magnetization of the first magnet runs parallel to said coil axis and/or cylinder axis.

14. The actuator according to claim 11, wherein the electrically conducting coil comprises a conductor that is wound around a coil axis running perpendicular to the plane the coil axis runs parallel to the cylinder axis of the first magnet of the plurality of magnets, and the magnetization of the first magnet runs parallel to the coil axis and/or cylinder axis.

15. The actuator according to claim 1, wherein the electrically conducting coil is embedded into a printed circuit board.

16. The actuator according to claim 1, wherein the wall member comprises a recess, and the electrically conducting coil is arranged along the recess.

17. The actuator according to claim 16, further comprising a second electrically conducting coil and a third electrically conducting coil, wherein the electrically conducting coil is equally spaced from the second electrically conducting coil and the third electrically conducting coil along the recess.

18. The actuator according to claim 1, wherein the magnetic flux guiding structure faces or opposes the electrically conducting coil.

19. The actuator according to claim 1, wherein the magnetic flux return structure is adjacent to the electrically conducting coil.

20. The actuator according to claim 1, wherein the magnetic flux return structure comprises regions extending laterally on either side of the electrically conducting coil as well as a region protruding info the electrically conducting coil.

21. The actuator according to claim 1, wherein the electrically conducting coil extends along the magnet and faces a side of the magnet, so that when a current is applied to the electrically conducting coil, a Lorentz force is generated that causes the magnet and the electrically conducting coil to attract each other or to repel each other depending on a direction of the current in the electrically conducting coil.

22. The actuator according to claim 21, wherein the electrically conducting coil comprises an outer contour that mimics a contour of the side of the magnet.

* * * * *

UNITED STATES PATENT AND TRADEMARK OFFICE
CERTIFICATE OF CORRECTION

PATENT NO. : 11,500,132 B2
APPLICATION NO. : 16/880597
DATED : November 15, 2022
INVENTOR(S) : Manuel Aschwanden et al.

It is certified that error appears in the above-identified patent and that said Letters Patent is hereby corrected as shown below:

In the Claims

Column 22, Claim 20, Line 50, delete "info" and insert in its place --into--.

Signed and Sealed this
Twenty-seventh Day of December, 2022

Katherine Kelly Vidal
*Director of the United States Patent and Trademark Office*